US012134482B1

(12) United States Patent
Schlichting

(10) Patent No.: US 12,134,482 B1
(45) Date of Patent: Nov. 5, 2024

(54) AERIAL VEHICLE TOWING SYSTEMS AND METHODS

(71) Applicant: Government of the United States, as represented by the Secretary of the Air Force, Wright-Patterson AFB, OH (US)

(72) Inventor: Grant Sharp Schlichting, Cannon Falls, MN (US)

(73) Assignee: United States of America as represented by the Secretary of the Air Force, Wright-Patterson AFB, OH (US)

(*) Notice: Subject to any disclaimer, the term of this patent is extended or adjusted under 35 U.S.C. 154(b) by 100 days.

(21) Appl. No.: 17/899,846

(22) Filed: Aug. 31, 2022

Related U.S. Application Data

(60) Provisional application No. 63/316,164, filed on Mar. 3, 2022, provisional application No. 63/249,055, filed on Sep. 28, 2021.

(51) Int. Cl.
*B64D 39/00* (2006.01)
*B60L 53/00* (2019.01)

(52) U.S. Cl.
CPC .............. *B64D 39/00* (2013.01); *B60L 53/00* (2019.02); *B60L 2200/10* (2013.01)

(58) Field of Classification Search
CPC .......... B64D 3/02; B64D 39/00; B64D 39/06; B64G 1/005; B64U 70/20; B64U 50/34
See application file for complete search history.

(56) References Cited

U.S. PATENT DOCUMENTS 2,402,918 A    6/1946   Schultz
2,692,094 A  * 10/1954   Brown ..................... B64D 3/00
                                                           89/1.51

(Continued)

FOREIGN PATENT DOCUMENTS

DE          10147144 C1     2/2003
WO        96/15941         5/1996

OTHER PUBLICATIONS

Tara Fadenrecht, How a KC-135 Tanker Saved a Badly-Damaged F-111 By Towing Jet Using Flying Boom, published on the internet Apr. 27, 2019 at https://fighterjetsworld.com/historic-aircraft-and-incident/kc-135-tanker-saved-a-badly-damaged-f-111/13080/.

(Continued)

*Primary Examiner* — Joshua J Michener
*Assistant Examiner* — Ryan Andrew Yankey
(74) *Attorney, Agent, or Firm* — AFMCLO/JAZ; Jeffrey V. Bamber

(57) ABSTRACT

Apparatuses, systems, and methods for towing an aircraft mid-flight are disclosed. The apparatuses include a tow line receiver that is configured for releasably mechanically joining to an aircraft connector on an aircraft to be towed. The aerial vehicle towing system includes an aircraft connector on the aircraft to be towed, a tow line receiver, a tow line, and a winch. Several methods are also provided. These include: a method of towing or retrieving an aircraft in flight; a method of recharging an electrically-powered aircraft in flight; methods of towing and refueling aircraft in flight; a method of communicating between a tow aircraft and an aircraft being towed; and combinations of these methods.

2 Claims, 15 Drawing Sheets

(56) References Cited

U.S. PATENT DOCUMENTS

| | | | |
|---|---|---|---|
| 3,135,511 A * | 6/1964 | Norman | B64D 5/00 343/705 |
| 3,224,714 A | 12/1965 | Mulcahy, Jr. et al. | |
| 5,048,773 A | 9/1991 | Washington et al. | |
| 5,549,259 A | 8/1996 | Herlik | |
| 6,869,042 B2 | 3/2005 | Harrison | |
| 8,868,256 B2 | 10/2014 | Waid | |
| 9,010,690 B1 | 4/2015 | Al-Heraibi | |
| 9,150,311 B2 | 10/2015 | Rix | |
| 9,227,735 B2 | 1/2016 | Kusnitz | |
| 9,302,793 B2 | 4/2016 | Ghofranian et al. | |
| 9,637,238 B2 | 5/2017 | Wypyszynski | |
| 10,246,189 B2 | 4/2019 | Paunicka et al. | |
| 10,532,663 B2 | 1/2020 | Ricci | |
| 10,618,668 B2 | 4/2020 | Pruzan et al. | |
| 10,654,584 B2 | 5/2020 | Bosma | |
| 10,676,189 B1 * | 6/2020 | Lytle | B64U 10/60 |
| 10,689,109 B2 | 6/2020 | Wypyszynski et al. | |
| 10,960,976 B2 | 3/2021 | Bosma et al. | |
| 2003/0183719 A1 * | 10/2003 | Bevilaqua | B64D 5/00 244/2 |
| 2015/0336677 A1 | 11/2015 | Smaoui et al. | |
| 2016/0031564 A1 * | 2/2016 | Yates | B64C 39/024 307/9.1 |
| 2016/0075441 A1 | 3/2016 | Elsawah | |
| 2016/0251088 A1 | 9/2016 | Melish et al. | |
| 2017/0144761 A1 * | 5/2017 | Bluvband | B64C 3/46 |
| 2017/0297712 A1 * | 10/2017 | Kim | F42B 15/08 |
| 2018/0265211 A1 * | 9/2018 | Burgener | B64D 27/023 |
| 2019/0237999 A1 | 8/2019 | Tillotson | |
| 2020/0331605 A1 | 10/2020 | Wypyszynski et al. | |
| 2020/0346781 A1 | 11/2020 | Bosma | |
| 2021/0053696 A1 | 2/2021 | Bosma | |
| 2021/0070465 A1 | 3/2021 | Bosma | |
| 2021/0139161 A1 * | 5/2021 | Nissen | B64D 5/00 |
| 2021/0163148 A1 | 6/2021 | Bosma | |
| 2021/0163149 A1 | 6/2021 | Bosma | |
| 2021/0163151 A1 | 6/2021 | Bosma | |
| 2021/0237606 A1 | 8/2021 | McNair et al. | |
| 2021/0253264 A1 | 8/2021 | Bosma | |
| 2024/0199237 A1 * | 6/2024 | Yifrach | B64G 1/4005 |
| 2024/0199238 A1 * | 6/2024 | Gallo | B64D 5/00 |

OTHER PUBLICATIONS

Joseph W. Nichols, et al., Aerial Rendezvous of Small Unmanned Aircraft Using a Passive Towed Cable System, Journal of Guidance, Control and Dynamics, Jul. 2014, vol. 37, No. 4, published on the internet at https://www.researchgate.net/publication/270085476.

Dynetics, Gremlins Air Vehicles: The Road to Airborne Recovery, referring to UAVs that had first flight in 2019, published on the internet on Jan. 5, 2022 at https://www.dynetics.com/newsroom/features/2022/gremlins-air-vehicles-the-road-to-airborne-recovery.

NASA, Past Projects: Eclipse Tow Launch Demonstration, Aug. 31, 2009, published on the internet at https://www.nasa.gov/centers/dryden/history/pastprojects/Eclipse/index.html.

Erickson, How Are SpaceX Grid Fins Powered?, Mar. 11, 2022, published on the internet at https://www.eclipseaviation.com/how-are-spacex-grid-fins-powered/.

Dominic Perry, Bell Seeks to Plug Range Gap With In-Flight Charging for Electric Aircraft, Aug. 16, 2021, published on the internet at https://www.flightglobal.com/defence/bell-seeks-to-plug-range-gap-with-in-flight-charging-for-electric-aircraft/145102.article.

Embention, FALCon Inflight reusable rocket launcher capture for space ecosystem care and cost reduction, article states that Mar. 2019 project was established, published on the internet at https://www.embention.com/projects/falcon-project/.

U.S. Dept. of Transportation, Federal Aviation Administration, Glider Flying Handbook Chapter 12, Towing, 2013, published on the internet at https://www.faa.gov/regulations_policies/handbooks_manuals/aviation/glider_handbook.

Author Unknown, Lockheed Martin CL-1201 Flying Aircraft Carrier, that was designed in the late 1960's, published on the internet at https://www.simpleplanes.com/a/6V0A41/Lockheed-Martin-CL-1201-Flying-Aircraft-Carrier.

NASA, "Gliding to Space": A Novel Means of Launching Space Satellites, Jan. 11, 2013, published on the internet at https://www.nasa.gov/centers/dryden/Features/towed_glider_concept.html.

Michael Frederick, et al., Using Aerial Towing to Study Sonic Booms, published Oct. 1, 2017, available on the internet at https://www.techbriefs.com/component/content/article/tb/pub/briefs/aerospace/27685.

Martin Sippel, et al., Highly Efficient RLV-Return Mode "In-Air-Capturing" Progressing by Preparation of Subscale Flight Tests, 8th European Conference for Aeronautics an Space Sciences (EUCASS), 2019, published on the internet at https://safe.menlosecurity.com/doc/docview/viewer/docN5EDBD40878EB16d3b0a4d65a1c39ebf0b660b1bc5620d4ec1492c93763498a03885cf218d55e.

Stefan Krause et al., UAV Pre-Study for In-air Capturing Maneuver, German Aerospace Center, 2020, published on the internet at https://ieeexplore.ieee.org.

Grant Schlichting, C1C Grant Schlichting Spark Tank Submission—Aerial Tow Rehookup, Oct. 12, 2021, published on the internet at https://www.dvidshub.net/video/817512/c1c-grant-schlichting-spark-tank-submission-aerial-tow-rehookup.

Author Unknown, World record for most gliders towed into flight (9 gliders in total!!!), You Tube video dated Nov. 6, 2006, posted on You Tube on Jun. 18, 2020 at https://www.youtube.com/watch?v=mZ92D_HBm2s.

Daniel Wilson, et al., Autonomous Close Formation Flight, aerial autonomy developed with Simulink, You Tube video posted on Dec. 19, 2014 at https://www.youtube.com/watch?v=3JYyQ0HidqE&list=PL6ERZUZHFxZGh3WLItz828-ptDzzBMNtX&index=32.

C. David Solomon, et al., Rapid Aerial Extraction System Raes Tm Drop and Lift Test, published by Modern Technology Solutions, Inc. on Feb. 21, 2019, You Tube video posted Jul. 16, 2019 at https://www.youtube.com/watch?v=Zcxo3IUzH-g&list=PL6ERZUZHFxZGh3WLItz828-ptDzzBMNIX&index=50.

Ian D'Costa, This is how American Pilots used drop tanks as bombs during WWII, We Are The Mighty website, published on the internet Nov. 18, 2021 at https://www.wearethemighty.com/popular/wwii-drop-tank-bombs/.

* cited by examiner ns, and methods can be used for retrieving aircraft, delivering aircraft to other locations, communicating with aircraft, and/or servicing aircraft mid-flight.

AERIAL VEHICLE TOWING SYSTEMS AND METHODS

Pursuant to 37 C.F.R. § 1.78(a)(4), this application claims the benefit of and priority to prior filed Provisional Application Ser. No. 63/249,055, filed Sep. 28, 2021, and Provisional Application Ser. No. 63/316,164, filed Mar. 3, 2022, which are expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to apparatuses, systems, and methods for towing an aircraft mid-flight. The apparatuses, systems, and methods can be used for retrieving aircraft, delivering aircraft to other locations, communicating with aircraft, and/or servicing aircraft mid-flight.

BACKGROUND OF THE INVENTION

Airplanes have been used to tow aircraft (such as gliders) in order to launch the same into flight. Prior methods typically involve the gliders being located on the ground at the initiation of the towing process. The prior methods include those in which one tow airplane can tow multiple gliders. However, it can be difficult to launch multiple gliders when they are located on the ground, and the tow airplane must fly above the gliders in order to launch the gliders.

In some cases, it may be necessary or desirable to tow aircraft that are already in flight. For example, it may be necessary to rescue disabled aircraft.

In other cases, it may be necessary to retrieve unmanned aerial vehicles (such as drones) that are in flight. Some current drone retrieval methods use a net to capture the unmanned aerial vehicle. Other methods require the unmanned aerial vehicle to be brought into the cargo bay of the retrieving aircraft. The latter technique limits the drone's size and weight to that which can be held within the retrieving aircraft's cargo bay. Further, neither of these methods for retrieving drones permit the drone to continue flying on its mission after it has been retrieved.

In still other cases, it may be desirable to deliver unmanned aerial vehicles to different locations in order to extend the range of the unmanned aerial vehicle. For example, it may be desirable to deliver unmanned aerial vehicles to an area conflict that would otherwise be outside the range of the unmanned aerial vehicles if launched from the ground or other stationary locations.

Therefore, a need exists for improved methods of towing, retrieving, delivering aircraft to other locations, and/or servicing aircraft mid-flight.

SUMMARY OF THE INVENTION

The present invention relates generally to apparatuses, systems, and methods for towing an aircraft mid-flight. The apparatuses, systems, and methods can be used for many purposes including, but not limited to: retrieving aircraft, delivering aircraft to other locations, communicating with aircraft, and/or servicing aircraft mid-flight.

While the invention will be described in connection with certain embodiments, it will be understood that the invention is not limited to these embodiments. To the contrary, this invention includes all alternatives, modifications, and equivalents as may be included within the spirit and scope of the present invention. Several of the embodiments and methods described herein can comprise independent inventions in their own right.

A tow line receiver for an aerial vehicle towing system is provided in one embodiment. The tow line receiver comprises:
 a fuselage comprising a front end comprising a nose portion, an open rear end, and an interior, wherein the open rear end is configured for receiving a portion of the nose of an aircraft to be towed; and
 a receiving body positioned in the open rear end of the fuselage and disposed at least partially in the interior of the fuselage, wherein the receiving body comprises a receiver connector that is configured for releasably mechanically joining the tow line receiver to an aircraft connector on an aircraft to be towed.

In another embodiment, an aerial vehicle towing system is provided. The aerial vehicle towing system comprises:
 an aircraft connector on said aircraft that may be towed, or for joining to an aircraft that may be towed using the aerial vehicle towing system;
 a tow line receiver such as described above;
 a tow line having a proximal end for joining to a winch on a tow aircraft and a distal end for joining to the front end of the fuselage of the tow line receiver; and
 a winch for joining to a tow aircraft for extending and retracting the tow line.

Several methods are also provided. In an embodiment, a method of towing or retrieving an aircraft in flight is provided. The method of towing or retrieving an aircraft in flight can be used for any suitable purpose including, but not limited to delivering the aircraft in flight to another location; for servicing the aircraft in flight; and for rescuing a disabled aircraft. The method comprises the steps of:
 a) providing a tow aircraft with an aerial vehicle towing system;
 b) when the aircraft to be retrieved is in flight, flying the tow aircraft in front of the aircraft to be retrieved;
 c) extending said tow line receiver toward the aircraft to be retrieved;
 d) establishing a connection between said aircraft connector on the aircraft to be retrieved and the tow line receiver; and
 e) towing the aircraft to be retrieved with said tow aircraft.

In another embodiment, a method for towing an aircraft, such as a powered aircraft, at a speed in excess of the aircraft's inherent maximum airspeed under its own power is provided.

In another embodiment, a method for towing an aircraft beyond its range is provided.

In another embodiment, a method of recharging an electrically-powered aircraft in flight is provided. This method may be used to recharge the electrically-powered aircraft while towing the electrically-powered aircraft which has its engine or motor shut off.

In another embodiment, a method of aerial refueling while towing is provided. In this method, the towed aircraft may operate with its engine(s) off, or a level of power that is less than that which would match the speed of the tow aircraft if it were not being towed. That is, the tow aircraft increases the speed of the aircraft being refueled and towed.

In another embodiment, a method of towing and refueling an aircraft in flight at supersonic speed is provided.

In another embodiment, a method of communicating between a tow aircraft and an aircraft being towed is provided. In some cases, the method of communicating can be used to manipulate the control surfaces of the aircraft being towed.

In another embodiment, a method for transferring items between two aircraft in flight is provided.

In another embodiment, a method for towing and launching a hypersonic vehicle is provided.

In another embodiment, a method for towing a space launch vehicle is provided.

Any of these embodiments can be combined to form other embodiments.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity of illustration.

DETAILED DESCRIPTION OF THE INVENTION

The present invention relates generally to apparatuses, systems, and methods for towing an aircraft mid-flight. The apparatuses, systems, and methods can be used for many purposes including, but not limited to: retrieving aircraft, delivering aircraft to other locations, communicating with aircraft, and/or servicing aircraft mid-flight. The term "servicing", as used herein, includes, but is not limited to aerial refueling, aerial recharging, and transferring items to or from an aircraft being towed.

Figure 1:
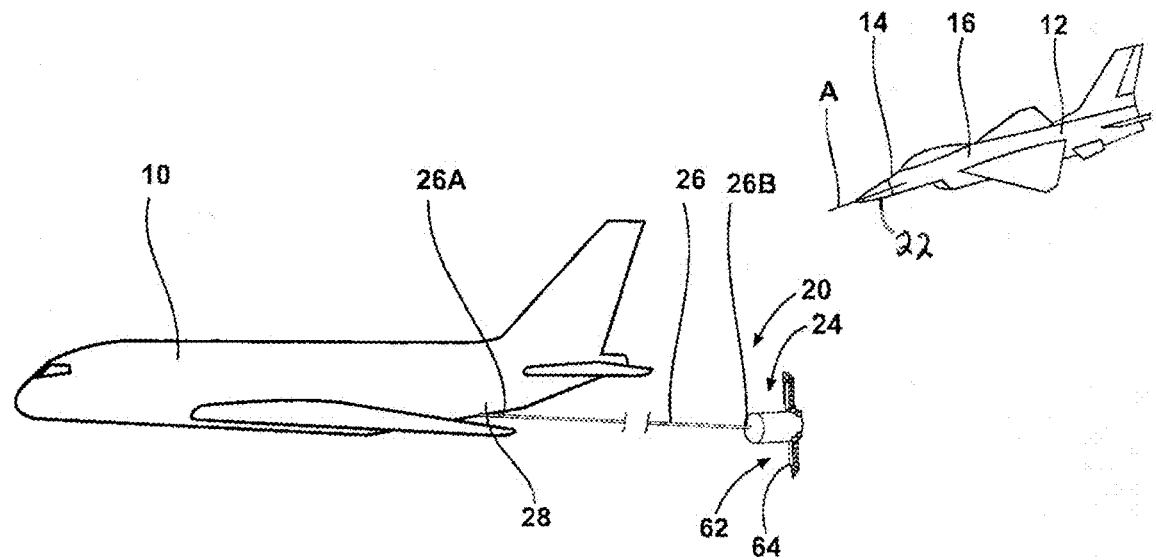
FIG. 1 is a schematic perspective view of one embodiment of an aerial vehicle towing system showing a tow aircraft extending a tow line and tow line receiver toward an aircraft to be retrieved.
Figure 2:
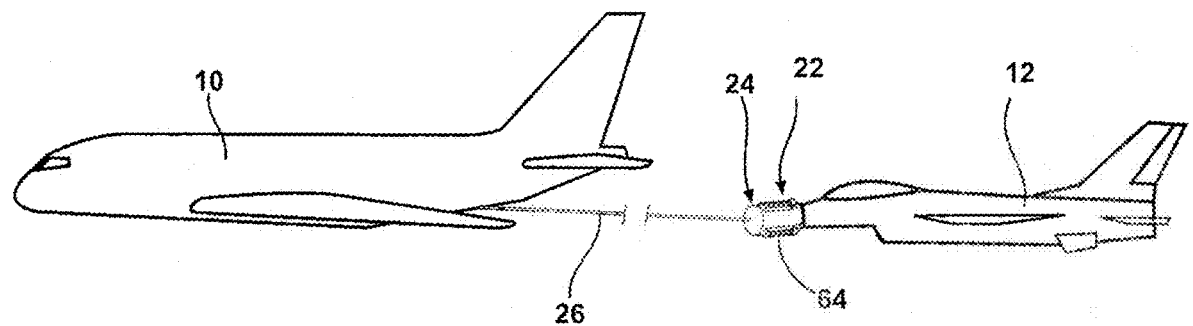
FIG. 2 is a schematic perspective view showing the entire tow package once the maneuver is complete, and the tow plane and aircraft are connected together.

FIGS. 1 and 2 show one non-limiting embodiment of the aerial vehicle towing system 20 of the present invention. FIG. 1 shows the system 20 joined to a tow aircraft ("tow plane") 10 that will be used to tow an aircraft 12 ("towed aircraft"). FIG. 2 shows the system 20 being used to tow the towed aircraft 12. The length of the tow line 26 between the tow aircraft 10 and the towed aircraft 12 will typically be much longer than that shown in FIGS. 1 and 2 (illustrated by the break in the tow line).

The system 20 differs from known systems for launching gliders in which there is only an initial hookup of the glider with the tow plane when the glider is on the ground. The system 20 may, in some cases, be referred to herein as an aerial tow "re-hookup" system. The term "re-hookup" refers to the fact that, in the present system, an aircraft 12 can fly by itself, meet up with the towing aircraft 10, be towed to an area near its destination, carry out its mission, and then re-hookup to be towed back to a base or to another location. Unlike with conventional gliders, the towed aircraft 12 in the present system can be re-hooked as many times in a sortie as necessary, similarly to aerial refueling where an aircraft can be refueled multiple times.

The terms "tow" and "towing", as used herein, refer to a process where a lead aircraft exerts a force on a trailing aircraft to pull the trailing aircraft in the direction the lead aircraft is traveling. The towing described herein is distinguishable from aerial refueling in which a tanker aircraft may deploy and tow a drogue or a refueling drone that is joined to a fuel line, but the tanker aircraft and the drogue or a refueling drone do not tow the fuel-receiving aircraft. In addition, in aerial refueling, the fuel-receiving aircraft is typically flying under its own power. The towing described herein is also distinguishable from processes in which an aerial vehicle is pulled into the cargo bay of a larger aircraft in that the towed aircraft is flying using its flight control surfaces, rather than being lifted out of its flying configuration.

The tow aircraft 10 can be any type of aircraft suitable for towing another aircraft. The size and power of the tow aircraft 10 will, of course, depend upon the characteristics of the aircraft 12 to be towed. The tow aircraft 10 can be a manned or unmanned aircraft. The tow aircraft 10 may include, but is not limited to: cargo aircraft (such as a C-130 or C17 aircraft), a transport aircraft (such as a C-141A aircraft), tow drones (such as a Lockheed Martin RQ-170 Sentinel unmanned aerial vehicle), and fighter aircraft.

The towed aircraft 12 can be any type of aircraft that is capable of being towed in flight. Typically, such aircraft will have a nose to which an aircraft connector can be joined. However, the towed aircraft 12 is not limited to aircraft having a nose. The aircraft being towed 12 can be a manned or unmanned aircraft, and a powered or non-powered aircraft. The towed aircraft 12 may also be a stealth aircraft including UAVs, fighter aircraft and bombers. The towed aircraft 12 may include, but is not limited to one or more of the following: unmanned aerial vehicles (e.g., drones), gliders, commercial passenger or cargo aircraft, military aircraft, supersonic-capable aircraft that cannot reach supersonic speeds without assistance, electric Vertical Take-off and Landing (eVTOL) systems, and aerial fueling drones (such as the Boeing MQ-25A Stingray tanker drone). Some of these types of aircraft, such as electric Vertical Take-off and Landing (eVTOL) systems are typically powered by battery/hybrid propulsion trains and do not have a very long range.

Other examples of the towed aircraft 12 may include, but are not limited to: Dynetics Corporation's X-61A Gremlins unmanned aerial vehicles; Northrop Grumman's RQ-4 Global Hawk remotely-piloted surveillance aircraft; and Joby Aviation's eVTOL aircraft. Dynetics Corporation's X-61A Gremlins unmanned aerial vehicles are currently configured to be recovered by a C-130 aircraft, and brought into the cargo bay of the C-130 aircraft using a stabilized towed docking device.

The towed aircraft 12 can also be a space launch vehicle. NASA has been developing a Glide-Boost (or boost-glide) capability, in which a two-stage to-orbit platform may be launched. This system would allow the glider to be reconnected and brought back to an airport, allowing for unannounced launches anywhere in the world. This limits the problems of storage and safe separation that is currently experienced by the main method of a two stage to-orbit aircraft.

The towed aircraft 12 can also be any type of vehicle that is capable of hypersonic flight. Thus, a hypersonic glide vehicle may be towed to the desired launch altitude, and then separated to fly its test mission. Similar to the space launch, the system can provide unannounced air launches of hypersonic vehicles anywhere in the world, and the hypersonic vehicle does not need a rocket to get up to altitude.

The aerial vehicle towing system 20 may be comprised of several components. These comprise: an aircraft connector 22; a tow line receiver (or "tow rope receiver") 24; a tow line (such as a tow rope) 26; and a device for extending and retracting the tow line, such as a winch 28 that is joined to the tow aircraft 10. The tow line 26 has a proximal end 26A that extends from the tow aircraft 10 and a distal end 26B that is joined to the tow line receiver 24.

Starting from the towed aircraft 12 and working towards the tow plane 10, the first component is the aircraft connector (or "first connector") 22. The aircraft connector 22 is an aircraft hookup on the towed aircraft 12. In some cases, the aircraft connector 22 may be joined to the towed aircraft 12. In some cases, the aircraft connector 22 may comprise a first portion for joining to the aircraft 12 to be towed, and a second portion configured for fitting into the tow line receiver 24. The aircraft connector 22 can be joined to any suitable part of the towed aircraft 12 at a location that may be referred to as the "hookup station". Typically, as shown in FIG. 2, if the towed aircraft 12 has a nose 14, the aircraft connector 22 will be joined to a hookup station that is on or near the nose 14 of the towed aircraft 12 for aerodynamic stability during towing. The nose 14 may have an axis A that runs through the tip of the nose 14 in a direction parallel to the body of the nose.

Figure 3:
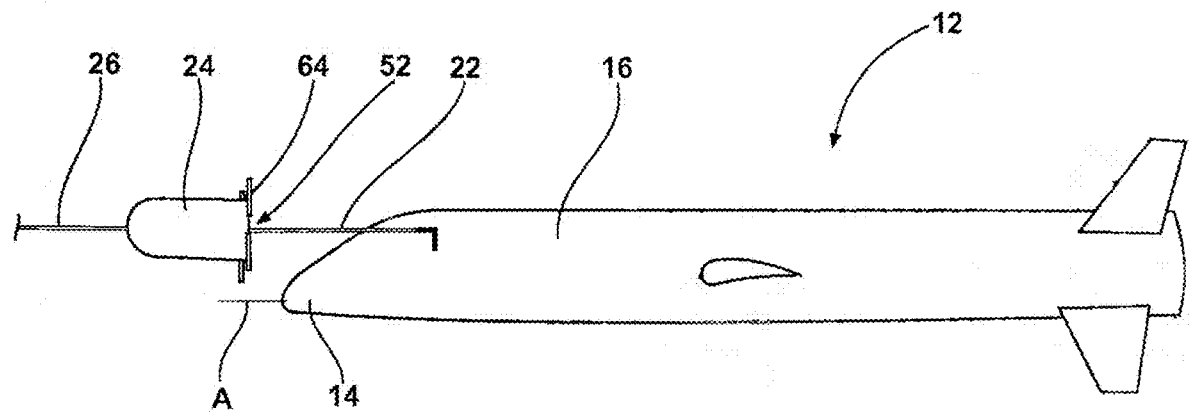
FIG. 3 is a schematic side view showing a tow line connector that is offset from the nose of an aircraft.
Figure 3A:
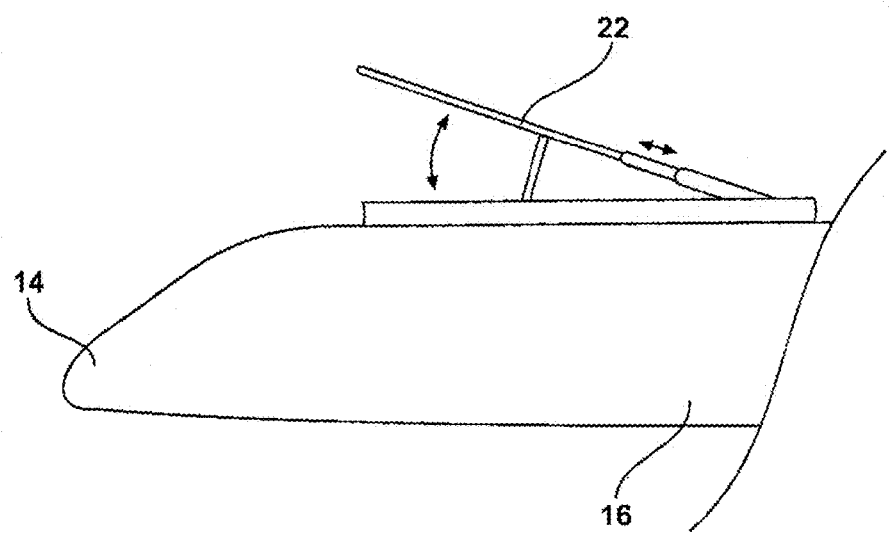
FIG. 3A is an enlarged fragmented schematic side view showing a retractable tow line connector that is offset from the nose of an aircraft.

FIG. 3 shows that in other cases, the hookup station may be located on a portion of the fuselage 16 of the towed aircraft 12 that is offset from the axis A of the nose 14. For example, as shown in FIG. 3, in some cases, the aircraft connector 22 can be joined to the fuselage 16 of the towed aircraft 12 at a hookup station that is on the side of the nose 14 like some aerial refueling probes. FIG. 3A shows that the aircraft connector 22 can also be streamlined with the fuselage 16 when not in use, and when needed for towing as shown by the arrows, extendable from the fuselage of the towed aircraft 12, and retractable after towing.

The aircraft connector 22 can comprise a male or a female component that is mechanically connectable to a respective female or male component ("second connector") that is joined to the tow line receiver 24. The aircraft connector 22 may at least partially fit into the open rear end of the tow line receiver 24. There are a non-limiting number of different embodiments of the aircraft connector 22. These can range from fairly simple to more complex. The simple embodiments are typically provided in situations where the strength of the connection between the aircraft connector 22 and the tow line receiver 24 does not have to be that great in order to securely join the towed aircraft 12 to the tow line receiver 24 for towing. The more complex embodiments are typically provided in situations that require a high strength connection between the aircraft connector 22 and the tow line receiver 24. The choice of the type of aircraft connector 22 often depends on the type, size, weight, and drag of the towed aircraft 12. In some cases, the aircraft connector 22 includes a mechanical and powered mechanism for uptake and release of the tow line receiver 24 that can be performed autonomously.

FIGS. 3 and 3A show one non-limiting embodiment of a relatively simple form of an aircraft connector 22. In the embodiment shown in FIG. 3, the aircraft connector 22 comprises a male component that can be mechanically joined to a female component such as a clamp inside the rear of the tow line receiver 24 in order to form a mechanical connection therebetween. In the particular embodiment shown, the aircraft connector 22 comprises a probe that extends from the fuselage 16 of the aircraft 12 to be towed. The probe is optionally extendable and retractable. This is an example of a simple form of the aircraft connector 22 can be used for towing small, light aircraft such as small, unmanned aerial vehicles (UAV's). In FIGS. 3 and 3A, the exemplary unmanned aerial vehicle is one of Dynetics Corporation's X-61A Gremlins unmanned aerial vehicles.

Figure 3B:
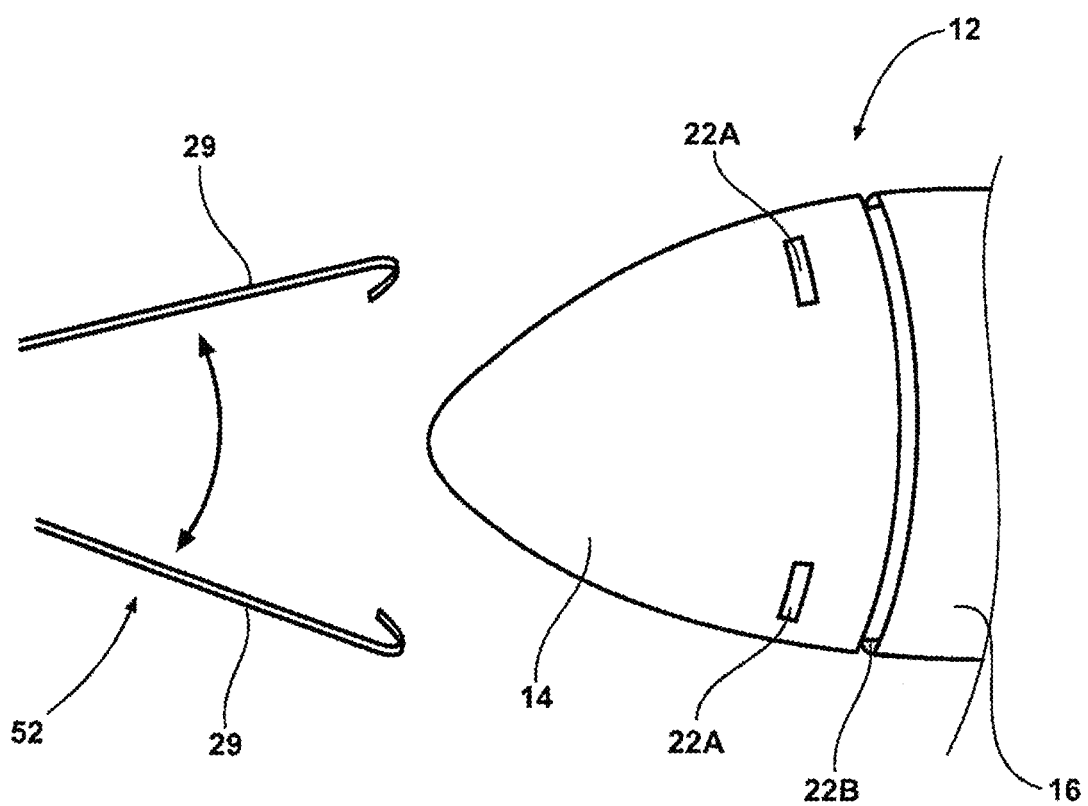
FIG. 3B is an enlarged fragmented schematic side view of a portion of the fuselage of an aircraft adjacent to the nose which has aircraft connectors in the form of indentations and recesses.

In other embodiments, such as shown in FIG. 3B, the aircraft to be towed 12 can have one or more aircraft connectors 22 that are in the form of indentations or recesses in its fuselage 16 near the nose 14 of the aircraft 12. These indentions or recesses can be engaged by clamps or hooks 29 that comprise part of the tow line receiver 24. The indentations can, in some embodiments, be in the form or separate indentations 22A. In other embodiments, they be recesses in the form of a continuous groove 22B around the fuselage of the aircraft to be towed 12. The clamps or hooks 29 may be capable of moving together and spreading apart as shown by the arrows.

Figure 4:
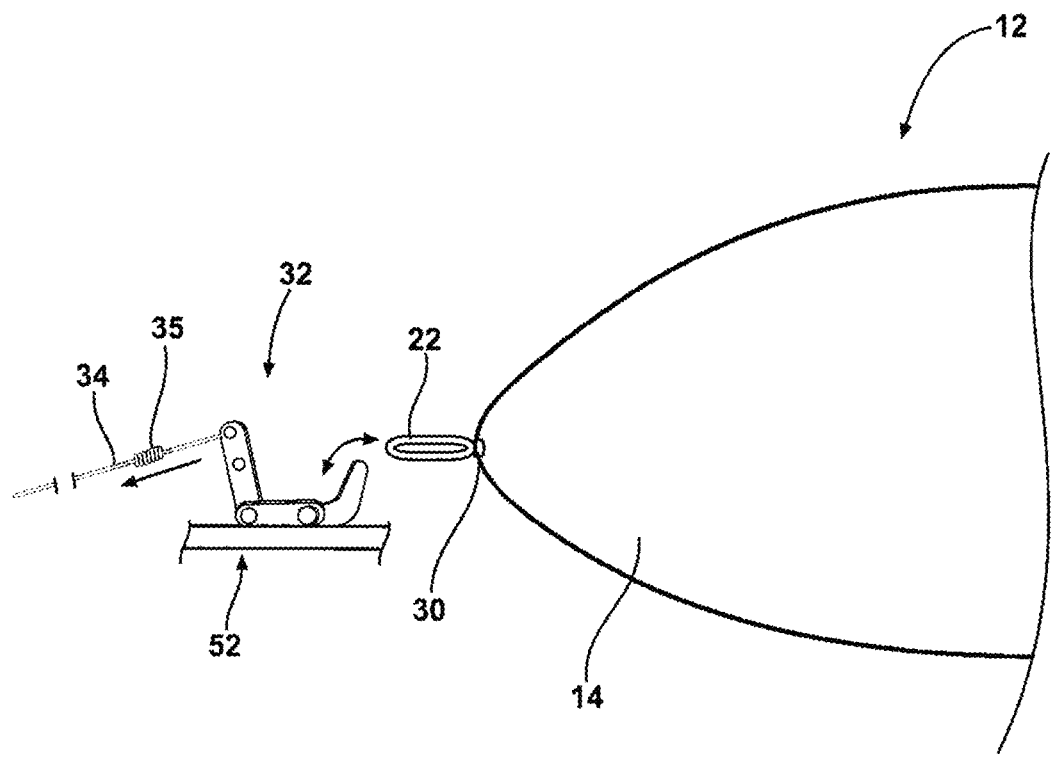
FIG. 4 is an enlarged fragmented schematic side view showing another embodiment of an aircraft connector in the form of a ring with a tow hook for engaging the same in an open position.
Figure 4A:
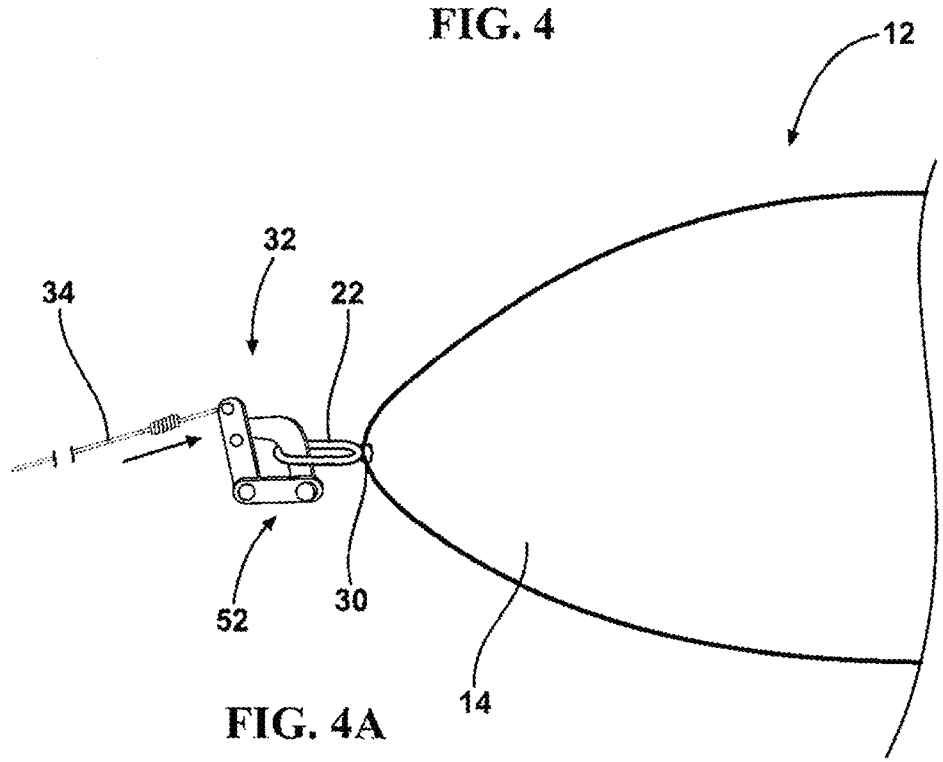
FIG. 4A is an enlarged fragmented schematic side view showing the aircraft connector in FIG. 4 with the tow hook in a closed position.
Figure 9:
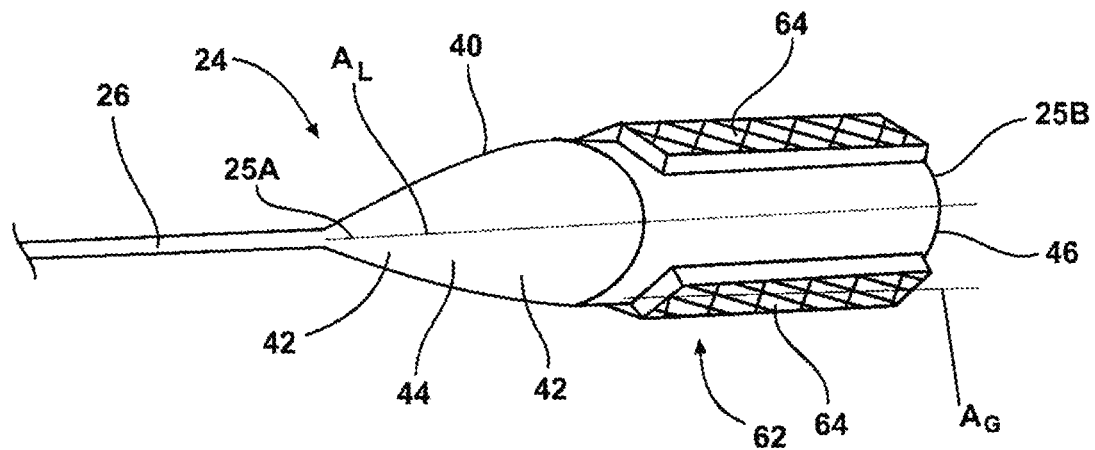
FIG. 9 is a schematic perspective view showing one embodiment of the tow line receiver with its grid fins in a closed position.
Figure 10:
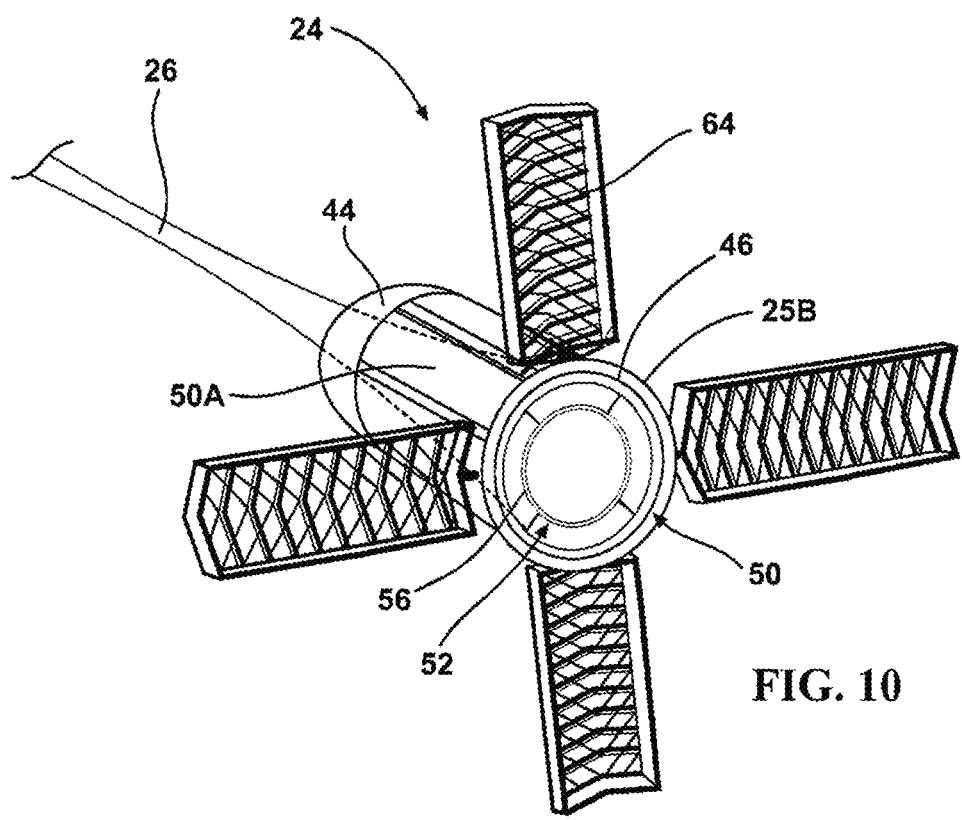
FIG. 10 is a schematic perspective view showing the tow line receiver with its grid fins in an open position.

FIGS. 4 and 4A show a non-limiting embodiment of an intermediate strength aircraft connector 22. In the embodiment shown in FIGS. 4 and 4A, the aircraft connector 22 comprises a modified Schweizer glider hookup. The aircraft to be towed 12 has a nose 14 and the aircraft connector 22 comprises a Schweizer ring that may be joined to a line or rope 30 extendable from the nose of the aircraft to be towed 12. The ring 22 is releasably connectable to a Schweizer tow hook 32 that will comprise part of the tow line receiver 24. The tow line receiver 24 is not shown in FIGS. 4 and 4A for simplicity of illustration, but it may be in a configuration similar to that shown in FIGS. 1, 2, 6, and 9-10. The Schweizer tow hook 32 may be located inside an opening in the rear of the tow line receiver 24. The opening in the rear of the tow line receiver 24 is shown in FIG. 10. The tow hook 32 has a release line 34 with a spring 35 joined thereto. The release line 34 opens the tow hook 32 when pulled, and closes the tow hook 32 when released. The release line 34 can be activated from the tow plane 10. When the connection between the ring 22 and the tow hook 32 is made, at least a portion of the tow line receiver 24 may fit over the nose 14 of the towed aircraft 12 as shown in FIG. 2. In this case, the aircraft to be towed 12 has to fly to the tow line receiver 24, be in the right position for the tow hook 32 to fit into the ring 22, and then close the connection. In other embodiments, the aircraft connector 22 may comprise a Tost tow ring, or a carabiner, and the tow line receiver 24 may comprise a mating component such as a Tost tow hook. These are examples of intermediate strength aircraft connectors 22 that can be used for towing aircraft such as gliders, single seat aircraft, two seat aircraft, or large drones.

Figure 5A:
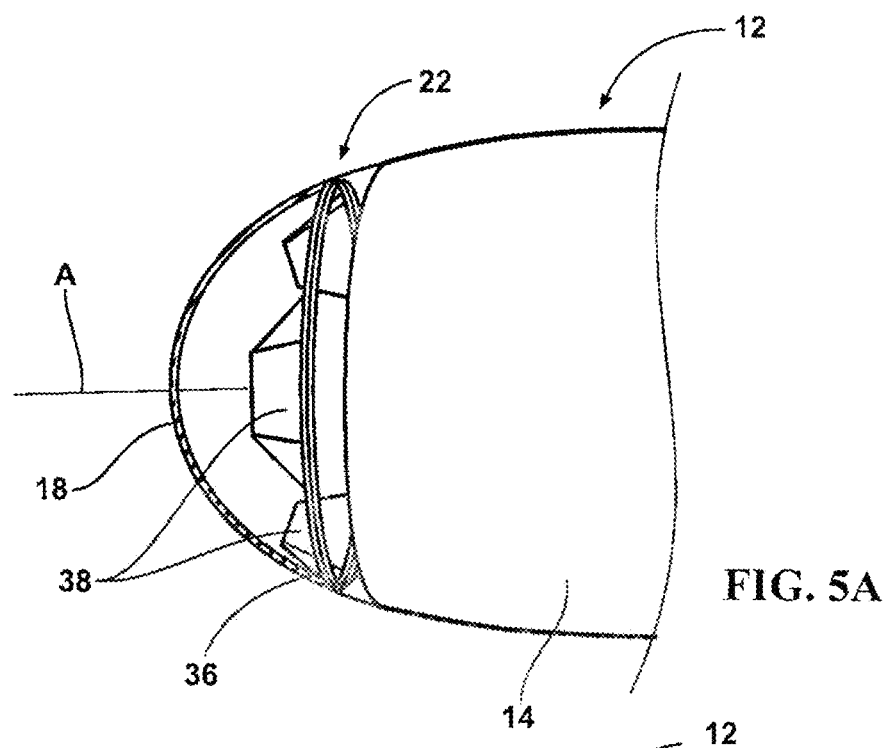
FIG. 5A is a fragmented schematic perspective view showing another embodiment of an aircraft connector with the nose of the aircraft to be towed partially cut away to show the aircraft connector inside the nose.
Figure 5B:
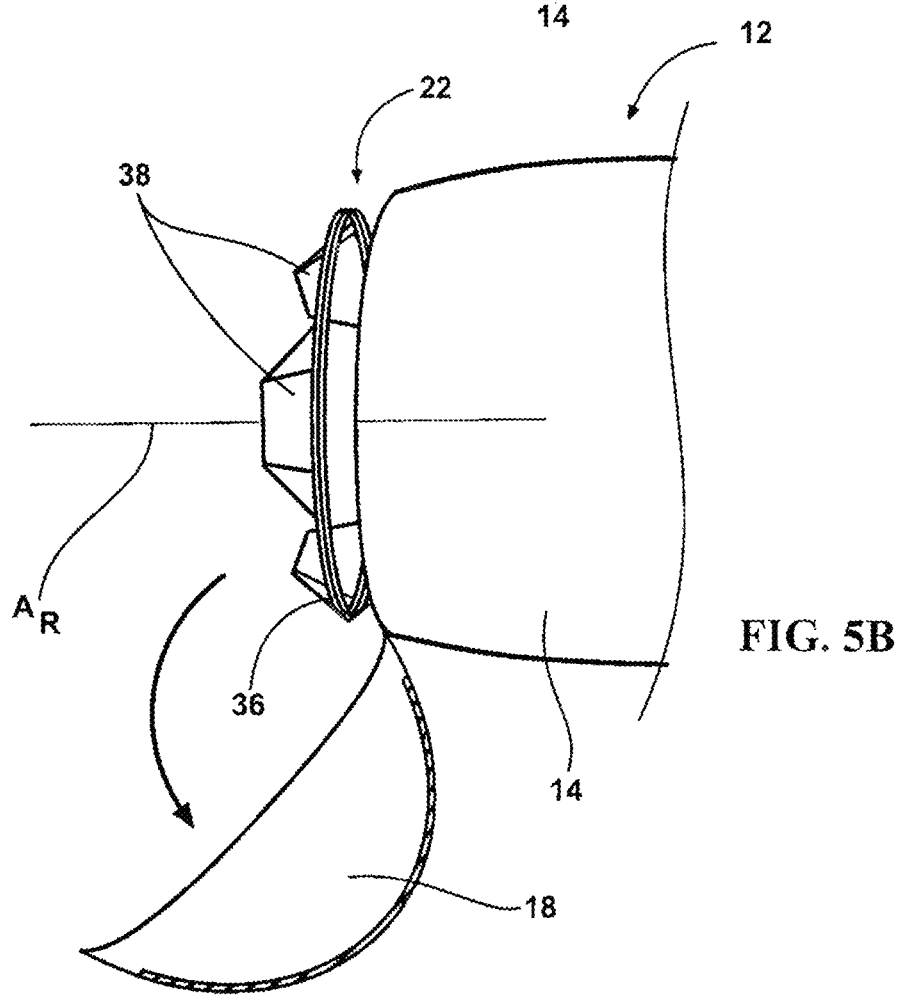
FIG. 5B is a schematic perspective view showing the aircraft connector in FIG. 5A with the front of the nose of the aircraft detached.

FIGS. 5A and 5B show another non-limiting embodiment of an aircraft connector 22. In the embodiment shown in FIGS. 5A and 5B, the aircraft connector 22 comprises a variation of the NASA spacecraft docking system described in the Boeing Company's U.S. Pat. No. 9,302,793 B2, Ghofranian, et al. The aircraft connector 22 used herein, however, does not require movable actuator assemblies as described in that patent. It is also expressly not admitted that the Ghofranian, et al. patent teaches or discloses the present invention.

Figure 5C:
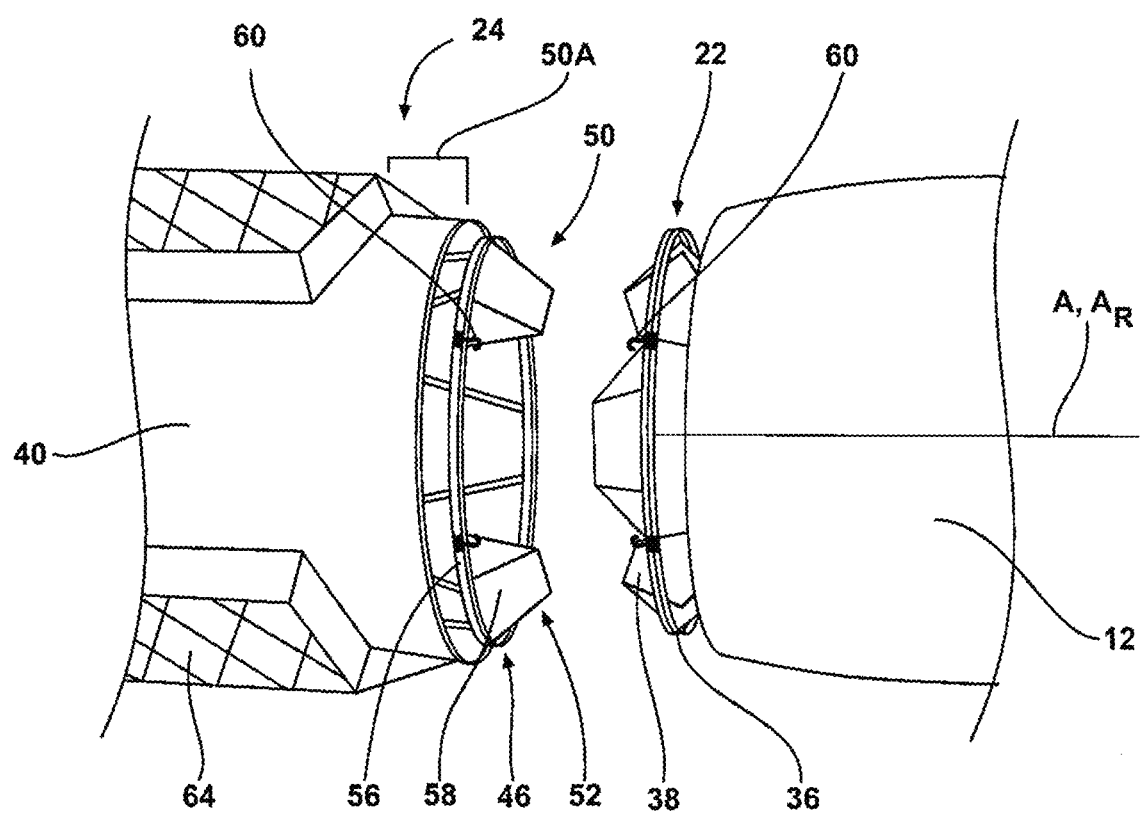
FIG. 5C is a fragmented schematic view showing the rear portion of a tow line receiver with a mating docking mechanism in position to connect to the aircraft connector shown in FIGS. 5A and 5B.

In FIGS. 5A and 5B, the aircraft connector 22 comprises a docking ring 36 that is joined to the aircraft 12 to be towed. The docking ring 36 can be considered to have an axis $A_R$ running through the center thereof. The points on the docking ring 36 may be considered to define a plane. The plane defined by the docking ring 36 may be oriented substantially perpendicular to the axis A running through the tip of the nose 14 of the towed aircraft 12. The axis running through the center of the ring $A_R$ and the axis, A, running through the tip of the nose 14 of the towed aircraft 12 coincide in the embodiment shown. However, these two axes need not coincide. The aircraft connector 22 may also comprise a plurality of alignment features 38 that are arranged along the docking ring 36 that extend outwardly from the outwardly-facing side of the docking ring 36. The alignment features 38 may be angled inwardly toward the axis of the ring $A_R$. The alignment features 38 may be configured for fitting into a mating capture ring 56 joined to the tow line receiver 24 as shown in FIG. 5C.

FIGS. 5A and 5B, show that the aircraft connector 22 can be joined to portions in the interior of the aircraft to be towed 12 (such as inside the nose of the aircraft 12). In this case, a portion of the aircraft 12 can be configured to open to expose the aircraft connector 22. In FIG. 5B, a portion 18 of the nose 14 is configured to be detached (remotely, or in any other suitable manner) to expose the aircraft connector 22. The aircraft connector shown in FIGS. 5A to 5C is an example of an aircraft connector 22 that can be used for towing heavier aircraft, such as those that are larger and/or heavier than a fighter jet.

The tow line receiver (or "tow rope receiver") 24 is used to establish a connection between the tow line 26 and the aircraft connector 22 on the towed aircraft 12. The towed aircraft 12 will, thus, be connected to the tow line 26 through the tow line receiver 24. FIGS. 9 and 10 show that the tow line receiver 24 has a forward end 25A, an aft end 25B, and a longitudinal axis $A_L$ extending between its forward and aft ends. The longitudinal axis $A_L$ of the tow line receiver 24 will typically be aligned in the general direction of travel of the tow line receiver when an aircraft is being towed.

The tow line receiver 24 shown in the drawings generally comprises a fuselage (or "main body") 40 having a front end 42 comprising a nose portion 44, a rear end 46, and an interior. In the embodiments shown in the drawings, the front end 42 of the fuselage 40 and the rear end 46 of the fuselage 40 correspond to the forward end and aft end of the tow line receiver 24, respectively. In other embodiments, portions of the tow line receiver 24 may extend longitudinally from the rear end 46 of the fuselage 40. The tow line receiver 24 further comprises a docking structure 50 into which a portion of (e.g., the nose of) the towed aircraft 12 may fit, a receiving body 52 for connecting to the aircraft connector 22 on the aircraft to be towed 12, and optional control elements 62 such as grid fins 64 joined to and/or extending from the fuselage 40.

Several embodiments of the tow line receiver 24 are shown in the drawings. The size of the tow line receiver 24 and the type of connection that it provides may vary, depending upon the type and size of the aircraft 12 that will be towed, as well as the type of aircraft connector 22 on the towed aircraft 12.

Figure 6:
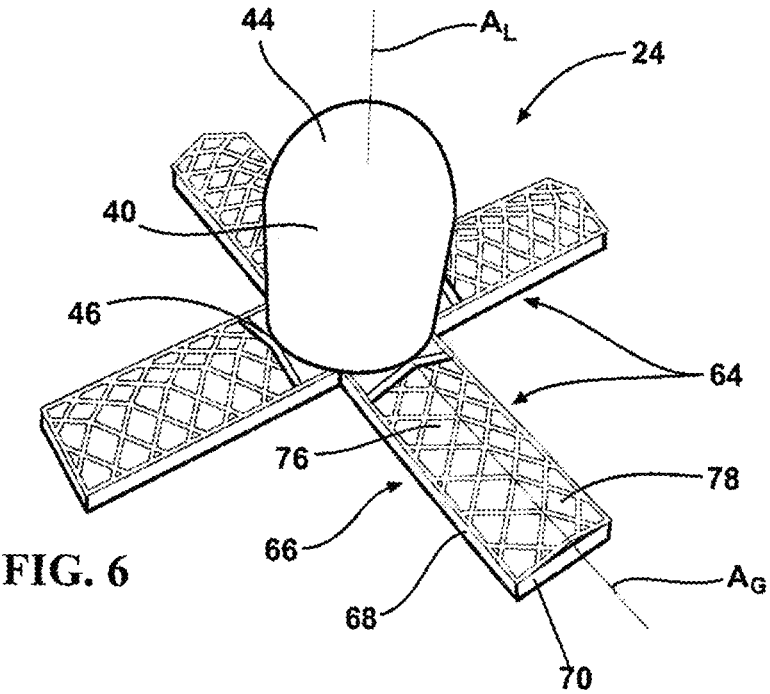
FIG. 6 is a perspective view of one non-limiting embodiment of a tow line receiver.
Figure 6A:
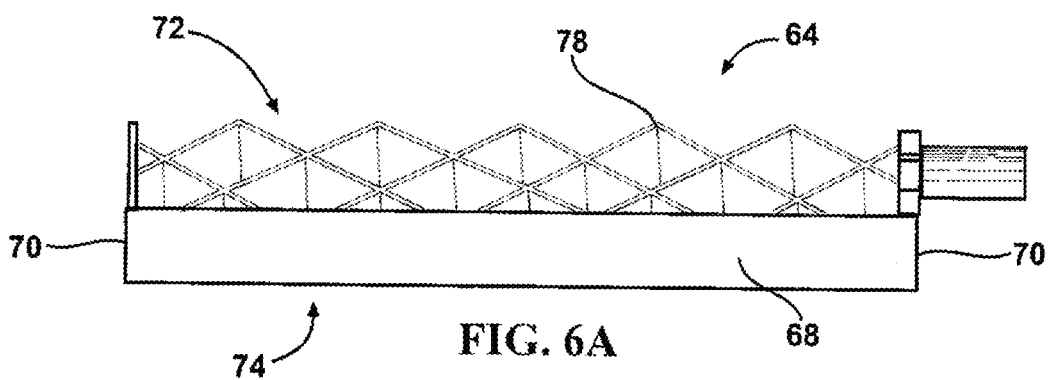
FIG. 6A is a side view of one of the grid fins on the tow line receiver shown in FIG. 6.

The fuselage 40 of the tow line receiver 24 may have any suitable configuration. In some embodiments, such as shown in FIG. 6, the fuselage 40 may have a generally cylindrical configuration and has a longitudinal axis that may coincide with the longitudinal axis $A_L$ of the tow line receiver 24. The fuselage 40 may comprise a nose portion 44 that may be aerodynamically shaped. The nose portion 44 may have any suitable aerodynamic shape, such as rounded like the front portion of a bullet as shown in FIG. 6, or conically-shaped as shown in FIG. 9. The interior of the fuselage may include space for the docking structure 50 and any mechanism for deploying the optional control elements 62.

The docking structure 50 shown in FIG. 10, much like a netting on an aerial refueling drogue is provided to give some leeway during the hook-up process to decrease pilot workload. The docking structure 50 may have any configuration suitable for this purpose including, but not limited to a tapered or conical configuration that narrows toward the forward end of the tow line receiver 24. For example, the docking structure 50 may be in the form of a hollow cone or conical body, and a receiving body. The cone may have a narrow end and a wide end. The narrow end may be configured to be joined to a tow line, and the wide end may have a receiving body 52 therein, or joined thereto. The receiving body 52 is configured to be connectable to the aircraft connector 22. The docking structure 50 should form an opening in the aft end of the tow line receiver 24 to accommodate the nose 14 (or, in some cases, another portion) of the aircraft to be towed 12.

The docking structure 50 may be located at least partially within the fuselage 40. In some embodiments, as shown in FIGS. 9 and 10, the docking structure 50 may be located entirely within the fuselage 40. In other embodiments, as shown in FIG. 5C, the docking structure 50 may extend outwardly from the rear of the fuselage 40. This will provide room in the fuselage 40 to house any internal mechanisms for deploying optional control elements 62 as hereinafter described. The docking structure 50 can comprise any suitable portion of the aft end portion of the tow line receiver 24. For example, the docking structure 50 can comprise any percentage of the length of the tow line receiver 24, including up to 50% thereof. Typically, the docking structure 50 will comprise the rearwardmost 25%-33% of the tow line receiver 24. Non-limiting examples of the location of the body 50A of the docking structure 50 are shown in FIG. 5C and FIG. 10. The docking structure 50 can be made of metal or composite materials.

The docking structure 50 of the tow line receiver 24 can be contrasted with aerial refueling equipment and methods. In aerial refueling, the probe-and-drogue refueling method uses a flexible hose that trails from a tanker aircraft. The drogue is a fitting resembling a badminton shuttlecock that has its nose attached to the flexible hose with a valve to the flexible hose. The drogue stabilizes the hose in flight and provides a funnel to aid insertion of the fuel-receiving aircraft's refueling probe into the hose. There are several important distinctions between the aerial vehicle towing system 20 and conventional aerial refueling systems. Aerial refueling systems are used when the aircraft being refueled is operating under its own power. Aerial refueling systems are, therefore, typically not designed to tow the aircraft being refueled, and may include a break-away connection if the forces on the refueling line become too large. This type of connection is generally not sufficient for aerial towing operations. Therefore, a mechanical connection that can withstand the forces of towing is generally required between the aircraft being towed 12 and the tow line receiver 24. The tow line 26 and connection with the aircraft 12 being towed may, thus, be free of a break-away connection that is activated under the forces associated with towing an aircraft. The mechanical connection referred to herein may also exclude connections that are solely held together by a pressure differential (e.g., suction).

The receiving body 52 forms a releasable mechanical connection with the aircraft connector 22 on the aircraft to be towed 12. The receiving body 52 may be positioned in the open rear end 46 of the tow line receiver 24. The receiving body 52 comprises a mechanical connector component (which may be referred to as a "receiver connector" or second connector) that is configured for releasably joining the tow line receiver 24 to an aircraft connector 22 on aircraft to be towed. Any suitable type of mechanical connector component can be used. The configuration of the receiving body 52 is one which mates (or mechanically engages with) the aircraft connector 22. Therefore, the configuration of the receiving body 52 can vary, depending on the configuration of the aircraft connector 22. Several non-limiting embodiments of the receiving body 52 are shown in the drawings.

FIGS. 3 and 3A show an embodiment in which the receiving body 52 may comprise a second connector that is in the form of a clamp that is located inside the tow line receiver 24 that is configured for clamping onto the probe that comprises the aircraft connector 22. FIG. 3B shows an embodiment in which the receiving body 52 comprises a plurality of clamps 29 having hooks on the end that are configured for engaging indentations 22A or recesses 22B on the fuselage 16 of the aircraft 12 to be towed.

FIGS. 4 and 4A show an embodiment in which the receiving body 52 comprises a second connector that is in the form of a hook 32 that is configured for engaging the ring 30 that comprises the aircraft connector 22.

FIG. 5C shows an embodiment in which the receiving body 52 is a second connector that is in the form of a capture ring 56 to which the aircraft connector 22 connects when the towed aircraft 12 is towed. The receiving body 52 may also comprise a plurality of alignment features 58 that are arranged along the capture ring 56 and may be angled inwardly and arranged to fit between the alignment features 38 of the docking ring 36. Once the docking ring 36 on the aircraft connector 22 is brought into alignment with the capture ring 56 of the receiving body 52, these two components may be joined together during the towing process. These components can be joined together in any suitable manner, such as by clamps 60 located on one or both of the docking ring 36 or capture ring 56. The clamps 60 can be in any suitable form including, but not limited to in the form of a plurality of tow hooks 32 such as those shown in FIGS. 4 and 4A that are spaced apart and distributed around one or both of the docking ring 36 or capture ring 56. In the aerial vehicle towing system 20, the active components of the docking system described in NASA's U.S. Pat. No. 9,302, 793 B2, Ghofranian, et al. are replaced with the docking structure 50. The docking structure 50 aligns the docking ring 36 and capture ring 56 without movable actuator assemblies.

The tow line receiver 24 may be shaped, or otherwise configured, to control the distal end 26B of the tow line 26 in order to make it easier to connect the aircraft to be towed 12 to the tow line 26. Various embodiments of the tow line receiver 24 are possible. In some embodiments, the tow line receiver 24 does not have any control elements, and the tow line receiver 24 comprises the docking structure 50, and relies on the tow plane pilot's skillful ability to fly into position. It may, however, be more desirable to control the position of the tow line receiver 24 to assist in the hook up process. For example, in some cases, the aircraft to be towed 12, such as a drone, may fly in a straight line, and the tow line receiver 24 may be manipulated to meet the aircraft to be towed 12. Controlling the position of the tow line receiver 24 decreases the workload of the aircraft to be towed 12 in order to align the aircraft to be towed 12 with the tow line receiver 24. This, in turn decreases the amount of sensors and other components the aircraft to be towed 12 must carry. Depending on the model and variant, the tow line receiver 24 may have motors and sensors along with remote control or autonomous capabilities to ease pilot workload during aerial vehicle hook up and towing.

In some cases, the tow line receiver 24 may comprise one or more optional control elements 62 to control aerodynamic forces and moments (that is, roll, pitch, and yaw) of the tow line receiver 24 during hookup in order to line up with the aircraft to be towed 12. The control elements 62 may include, but are not limited to: aerodynamic control surfaces, grid fins, canards, fins, wings, and combinations thereof.

In the embodiments shown in FIGS. 1-2 and 6-10, the control elements 62 comprise grid fins 64. The grid fins 64 may be used for remote steering of the tow line 26 to help position the tow line receiver 24 in line with the aircraft connector 22 on the aircraft to be towed 12. As shown in FIG. 6, the grid fins 64 have a longitudinal centerline or longitudinal axis $A_G$. The longitudinal axis $A_G$ is generally parallel to the fuselage 40 of the tow line receiver 24 when the grid fins 64 are undeployed as shown in FIG. 9. The grid fins 64 can be positioned at any suitable location along the length of the fuselage 40 of the tow line receiver 24 from behind the nose portion 44 of the fuselage 40 to the rear end 46 of the fuselage 40. In several of the embodiments shown in the drawings, the grid fins 64 can be positioned adjacent the rear end 46 of the fuselage 40.

Figure 6B:
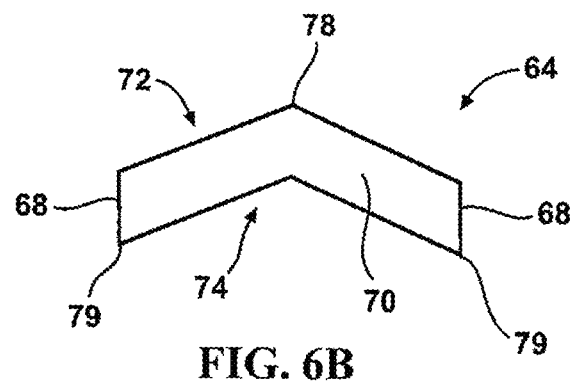
FIG. 6B is an end view of one of the grid fins.

The grid fins 64 comprise a body 66 having a pair of longitudinal sides 68, a pair of end edges 70, a first (or forward) surface 72, and a second (or aft) surface 74. The first and second surfaces 72 and 74 of the grid fins 64 may be wider than the longitudinal sides 68 and end edges 70. In some cases, the first and second surfaces 72 and 74 of the grid fins 64 may be several times wider than the longitudinal sides 68 and end edges 70. For example, the first and second surfaces 72 and 74 of the grid fins 64 may be two, three, or four or more times the width of the longitudinal sides 68 and end edges 70. The grid fins 64 may be relatively stiff, elongated elements having a plurality of openings 76 therein extending between their first surface 72 and their second surface 74 to allow air to pass therethrough. The grid fins 64 may have any suitable configuration. In the embodiment shown, the openings 76 are formed by a plurality of diagonally-oriented members that form a grid. When looking at the grid fins 64 from the end 70, the grid fins 64 may have a configuration that may be: rectilinear, or curved (convex outward) as shown in FIG. 9 to conform to the fuselage 40 of the tow line receiver 24. Alternatively, as shown in FIGS. 6 to 6B, the grid fins 64 may have a cross-sectional configuration that has a chevron-shape having a leading edge 78 on its forward surface 72 aligned with the longitudinal axis $A_G$ of the grid fins 64.

Figure 7A:
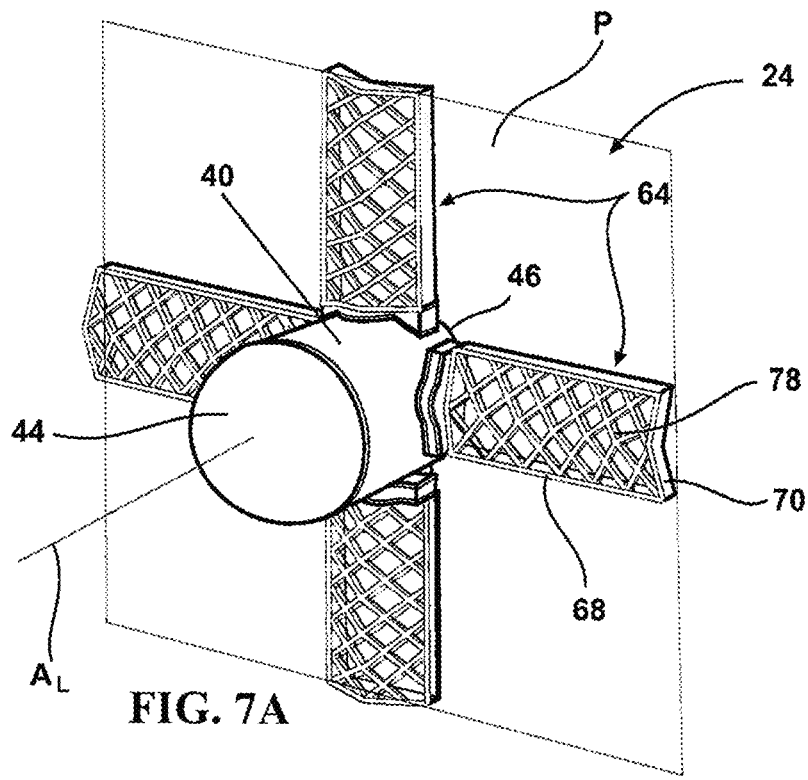
FIG. 7A is a perspective view of a tow line receiver similar to that shown in FIG. 6, with its grid fins in a non-rotated position that is perpendicular to the body of the tow line receiver.
Figure 7B:
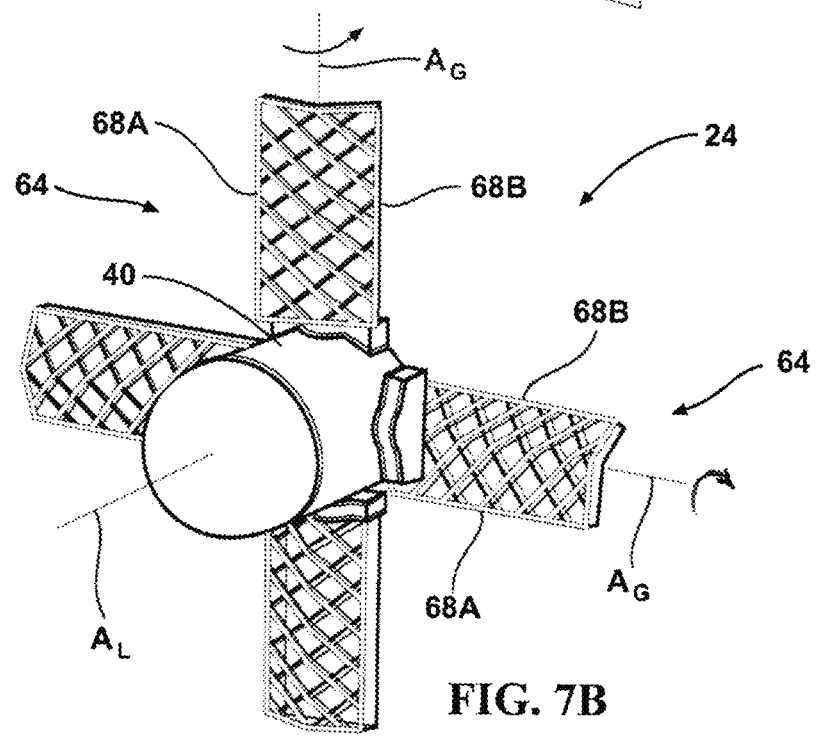
FIG. 7B is a perspective of the tow line receiver similar to FIG. 7A, shown with two of its grid fins rotated about their longitudinal axes.

FIGS. 7A and 7B show how the grid fins 64 can be rotated about their longitudinal axes $A_G$ to control the movement of the tow line receiver 24 in the air. FIG. 7A shows the grid fins 64 in a non-rotated position in which they are perpendicular to the fuselage 40 of the tow line receiver 24. More specifically, when the grid fins 64 are in a non-rotated position, their surfaces 72 and 74 can be considered to generally lie in a plane P that is perpendicular to the longitudinal axis $A_L$ of the tow line receiver 24. When the grid fins 64 have a cross-sectional configuration that is curved or chevron-shaped, the plane P can be considered to lie adjacent to the trailing edges 79 of the grid fins 64. FIG. 7B shows the tow line receiver 24 with two of its grid fins 64 rotated about their longitudinal axes $A_G$. When a grid fin 64 is rotated, one of its longitudinal sides 68A will move toward the direction of travel of the tow line receiver 24, and its other longitudinal side 68B will move away from the direction of travel of the tow line receiver 24.

Figure 8A:
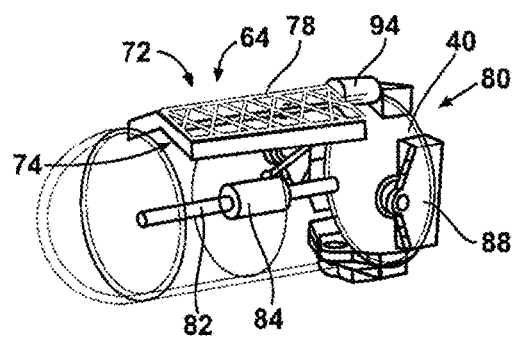
FIG. 8A is a schematic perspective view showing one embodiment of an internal mechanism for deploying the grid fins on the tow line receiver, with the grid fin shown in an undeployed configuration.
Figure 8B:
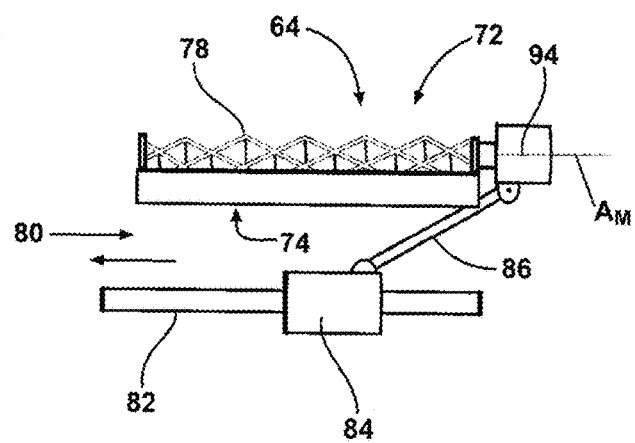
FIG. 8B is a schematic side view of the internal mechanism for deploying the grid fins on the tow line receiver, showing one of the grid fins undeployed.
Figure 8C:
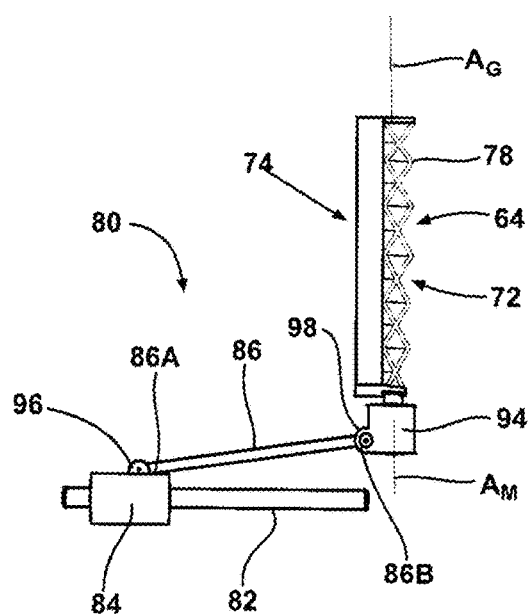
FIG. 8C is a schematic side view of the internal mechanism for deploying the grid fins on the tow line receiver, showing one of the grid fins in a deployed position, but before being rotated into its final position.
Figure 8D:
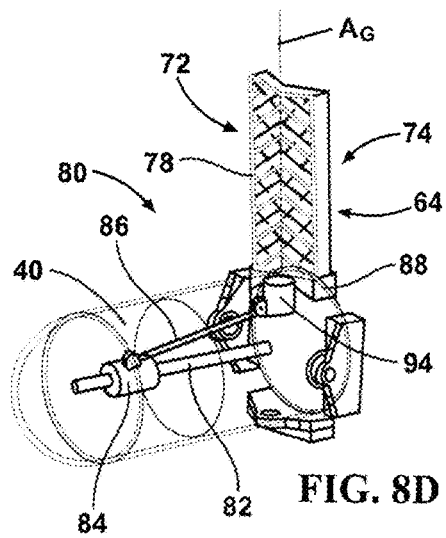
FIG. 8D is a schematic side view of the internal mechanism for deploying the grid fins on the tow line receiver, showing one of the grid fins deployed and rotated into its final position.

FIGS. 8A-8D show one embodiment of a mechanism 80 for deploying and rotating the grid fins 64 of the tow line receiver 24. In this embodiment, the grid fins 64 are rotatable so that they can be turned at least 180 degrees about their grid fin axis $A_G$. The mechanism 80 for deploying and rotating the grid fins 64 comprises a threaded screw pole 82 and a first motor (e.g., an electric motor) 84 that is joined to a worm gear mounted on the screw pole 82 that spins around and moves along the screw pole 82. A connecting rod (or arm) 86 operatively connects the electrical motor 84 to a swivel joint 88 for each grid fin 64. The first motor 84 is used for deploying the grid fins 64 from a stowed position where one of the sides 74 of each grid fin is adjacent to the fuselage 40 to a deployed position where the grid fins 64 extend outward from the fuselage 40. The stowed position is shown in FIGS. 8A and 8B. The initial deployed position and final deployed position are shown in FIGS. 8C and 8D, respectively. The grid fins 64 are deployed when the first motor 84 moves toward the forward end of the screw pole 82 (from the position shown in FIG. 8B in the direction of the arrow to the position shown in FIG. 8C). In the embodiment shown in FIGS. 8A-8D, the grid fins 64 have a pivot end that is located at the aft end of each of the grid fins 64. In other embodiments, the grid fins 64 may have a pivot end that is located at the forward end of each of the grid fins 64.

In the embodiment shown, each grid fin 64 has its own second motor (e.g., servo motor or electrical motor) 94 associated therewith. The second motor 94 is used to rotate the grid fins 64 about their grid fin axis $A_G$ after they are deployed. The connecting rod 86 has two ends comprising a first end 86A and a second end 86B, and is provided for connecting the first motor 84 and the second motor 94. As shown in FIG. 8C, the first end 86A of the connecting rod 86 is joined to the first motor 84 and the second end 86B of the connecting rod is joined to the second motor 94. The first and second motors 84 and 94 are not directly connected, but rather are each provided with a projection thereon having a hole therein for a pin to join the connecting rod thereto. The second motor 94 has an axis $A_M$ that changes orientation from being generally in the same direction as the longitudinal axis $A_L$ of the tow line receiver 24 when the grid fins 64 are stowed to generally perpendicular to the longitudinal axis $A_L$ of the tow line receiver 24 when the grid fins 64 are deployed.

FIG. 8C shows a grid fin 64 in a first position after it has been deployed. In this embodiment, in this first position, the first surface 72 of the grid fin 64 is facing rearward, and the second surface 74 of the grid fin 64 is facing forward. The grid fin 64 needs to be rotated to a second position shown in FIG. 8D in which the first surface 72 of the grid fin 64 is facing forward. The grid fins 64 can then be rotated about their axes $A_G$ to control the flight of the tow line receiver 24.

The grid fins 64 may each be in operational communication with a servo motor which is in operational communication with a steering system that is configured to steer the tow line receiver 24 to align with the nose of an aircraft to be towed. In some cases, it may be desirable for the grid fins 64 to be moved in a synchronized or coordinated manner so that they open and close the same amount at the same time, rather than deploying and closing independently relative to each other. In other embodiments, the grid fins 64 may move independently, if desired. The grid fins 64 may independently be rotated about their axes $A_G$ to control the flight of the tow line receiver 24.

Figure 11:
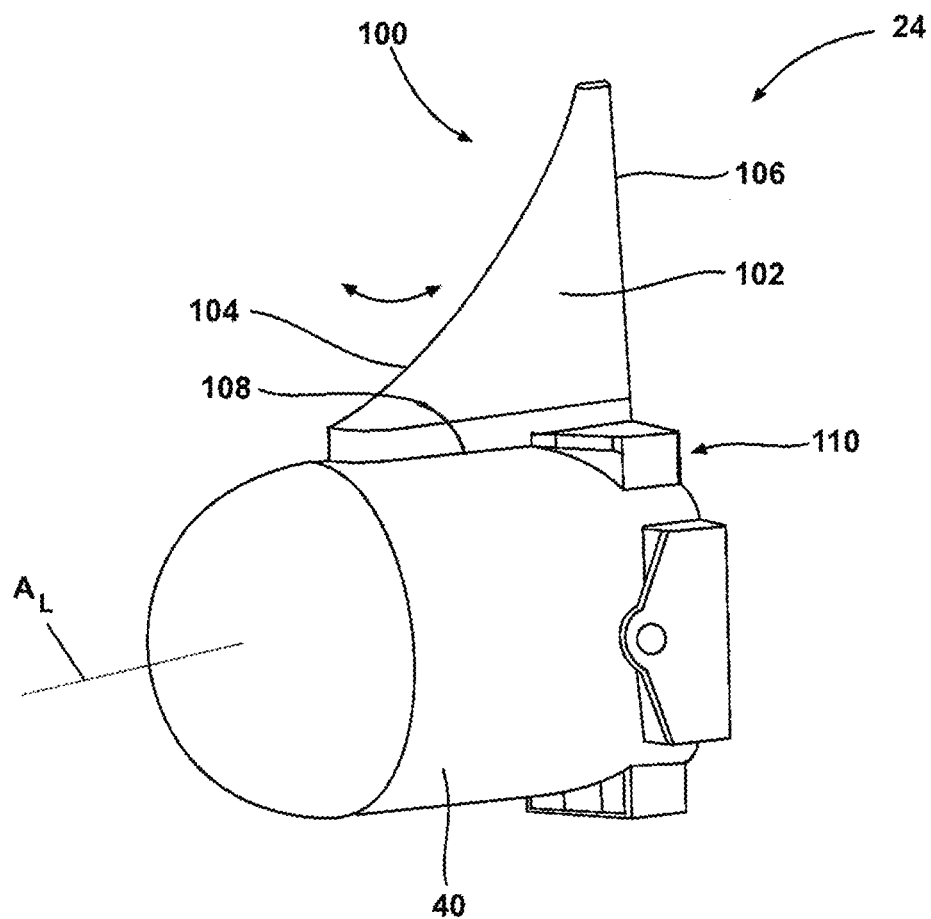
FIG. 11 is a perspective view of a tow line receiver having a fin thereon.

In addition to, or instead of grid fins 64, other types of control elements 62 can be provided on the tow line receiver 24. FIG. 11 shows a non-limiting embodiment in which control elements 62 in the form of fins 100 (one of which is shown) are joined to the fuselage 40 of the tow line receiver 24. In the embodiment shown in FIG. 11, there will be four fins distributed radially around the circumference of the fuselage 40 of the tow line receiver. The fins 100 are generally planar and have two generally planar surfaces 102, a leading edge 104, a trailing edge 106, and a bottom edge 108. The fins 100 are joined to the fuselage 40 along a portion of their bottom edges 108 wherein fins are independently rotatable so that their bottom edges 108 can move from being aligned parallel to the longitudinal axis $A_L$ of the tow line receiver 24 (and the fuselage 40) to being at an angle to the longitudinal axis $A_L$ of the tow line receiver. These fins 100 may each be provided with an adjustment mechanism 110 that allow the orientation of the fins to be adjusted so that they may be turned as shown by the double-headed arrow relative to the longitudinal axis $A_L$ of the tow line receiver 24. The adjustment mechanism for rotating the fins 100 can be similar to the mechanism for rotating the grid fins in the previous embodiment. The fins 100, however, do not have to be deployed. Therefore, the adjustment mechanism may have four servo (second) motors, but will not have the screw pole and the first motor.

Another alternative to grid fins comprises wings such as those used on aerial refueling booms to control the tow line receiver 24.

The tow line (such as a tow rope) 26 can comprise any suitable elongated, flexible component that is capable of towing the towed aircraft 12. The term "flexible", as used herein, refers to a component that will bend or drape under its own weight and can be coiled. The tow line 26 is not limited to conventional rope structures in which a group of yarns, plies, fibers, or strands are twisted or braided together into a larger and stronger form. The tow line 26 may, therefore, include cords, cables, straps, etc.

Typically, the tow line 26 will have a generally solid cross-section unlike an aerial refueling hose that will have a hollow inner passageway for conveying fuel. The tow line 26 should have a tensile strength that is suitable for towing the particular aircraft to be towed. The tensile strength may range from relatively low for towing a small UAV to relatively high for towing an aircraft that is larger and/or heavier, or that creates greater drag than a fighter jet. In non-limiting embodiments, the tensile strength of the tow line 26 can range from greater than or equal to about 500, 750, 1,000 lbs., and every 250 lb. increment, up to about 100,000 lbs. or more.

In situations that involve towing very heavy gliders, or towing at high velocities such as around Mach 0.85, it may be desirable for the tow line 26 to be very resistant to generating slack. That is, the tow line 26 may be relatively inextensible, or completely, inextensible (or static) under the forces associated with the towing operation. In cases in which a static tow line 26 is used, the winch 28 provides the ability to have a more dynamic feel than a stretchy tow line 26 under higher forces and loads. In other cases, it may be desirable for the tow line 26 to be extensible (or dynamic) under the forces associated with the towing operation.

The tow line 26 can be made of any suitable material(s) including natural materials, synthetic materials, and metals. Most tow ropes are made of synthetic materials, such as nylon. In one embodiment, the tow line 26 depending on the towed aircraft weight, can be made of a liquid-crystal polymer (LCP) that is believed to have been used during the NASA Dryden Eclipse Project. In this project, a fighter jet located on the ground was towed like a glider by a transport aircraft. This project is believed to have used a rope made of a synthetic fiber normally used in marine applications. One type of rope used in marine applications is the DYNEEMA® Ultra-High Molecular Weight Polyethylene (UHMwPE) fiber rope available from Dynamica Ropes ApS of Denmark.

The force winch (or simply "winch") 28 may be joined to the tow plane 10 to extend and retract the tow line 26 during the hookup process. The winch 28 may bring the tow line 26 and tow line receiver 24 into the tow aircraft 10 for take-off and landing. The winch 28 can be joined to any suitable portion of the tow plane 10. There can be more than one winch 28 if there is more than one towing system 20 for towing multiple aircraft. The winch(es) 28 may be located inside or outside the fuselage of the tow plane 10, or they may be located inside or outside the wings of the tow plane 10. The winches 28 can, for example, be located in the cargo bay of an aircraft, such as at the back of the aircraft, or on a wing pylon of the tow plane 10. The weight and drag of the towed aircraft 12 will dictate how strong the tow line 26 and the winch 28 have to be. The winch(es) 28 can be selected from various commercially available winches. The winch 28 ised in the aerial vehicle towing system 20 can be an "active" winch that may be operatively connected to a computer to automatically control the length of the tow line 26 during the hookup and towing process.

The components of the aerial vehicle towing system 20 (other than the tow line 26, the composition of which was described above) may be made of any suitable materials, including, but not limited to metals and composite materials.

FIGS. 1 and 2 show one embodiment of the method of using the aerial vehicle towing system 20. FIG. 1 shows an initial stage in use of the aerial vehicle towing system 20. The tow line receiver 24 and the tow line 26 have two modes, an extended mode and a retracted mode. FIG. 1 shows the tow line 26, with the tow line receiver 24 joined thereto, wound out of the tow plane 10 midflight by the winch 28 into its extended mode. If the tow line receiver 24 is provided with grid fins 64, the grid fins 64 will typically initially be in an undeployed configuration as shown in FIG. 9, before they are deployed as shown in FIG. 1. The drag on the fuselage 40 of the tow line receiver 24 is enough to keep it in position behind the tow plane 10.

The aircraft to be towed 12 starts behind the tow plane 10 and performs to initial maneuvers to align itself with the tow plane 10 and the tow line receiver 24 similar to the type of maneuvers used by aircraft for aerial refueling. If the aircraft to be towed 12 is a glider, the tow plane 10 may have to go into a descent below the glider in order to hookup. Powered aircraft can fly in a relatively straight line for hookup. Both aircraft 10 and 12 will then attempt to substantially match their airspeeds. After this steady state is achieved, the downwind aircraft 12 starts increasing its velocity to start to come in contact with the docking structure 50 of the tow line receiver 24.

If the tow line receiver 24 is provided with control surfaces 62 such as grid fins 64, the grid fins 64 will be deployed into an open position as shown in FIG. 1 at any suitable time during the process in order to assist in the hookup. The tow line receiver 24 is moved into position to come in contact with the aircraft connector 22 on the aircraft to be towed 12 by the grid fins 64, in order to decrease workload on the pilot of the tow plane 10. The servo motors may operate the grid fins 64 into the desired configuration to steer the tow line receiver 24. In some embodiments, the control of the tow line receiver 24 may be unmanned and handled by an automated system. This allows someone in the tow plane 10, or an automatic control process, to move the tow line receiver 24 into the optimal position for hookup (or re-hookup) by the towed aircraft 12. The tow plane 10 can also let the tow line 26 out or bring it in for hookup. If the aircraft to be towed 12 comes in for hookup too fast, the winch 28 can be used to decrease the length of the tow line 26. This combination of the manipulation of the grid fins 64 with the winch 28 increasing and decreasing the tow line 26 length makes the easiest flight path for the aircraft to be towed 12 to come in for hookup.

Once the towed aircraft 12 connects to the tow line receiver 24, it may have more velocity than the tow plane 10 and generate slack in the tow line 26. Because the aircraft to be towed 12 is flying faster than the tow plane 10, the winch 28 pulls the slack out of the tow line 26 (much like a fishing reel) so that the tow line 26 continues to stay taut. Keeping the tow line 26 taut avoids the tow line 26 getting wrapped around the wing of the towed aircraft 12, or causing a severe jerk which might damage the towed aircraft 12. Once the aircraft to be towed 12 is on-tow, the winch 28 increases the amount of tow line 26 between the tow plane 10 and the towed aircraft 12 so that the towed aircraft 12 can be in the optimal position to avoid down wash from the engines of the tow plane 10.

FIG. 2 shows the entire tow package once the maneuver is complete, and the tow plane 10 and towed aircraft 12 are joined together with the aerial vehicle towing system 20. In FIG. 2, the grid fins 64 are located adjacent or in recesses in the fuselage 40 of the tow line receiver 24. This assumes the towed aircraft 12 is manned, and can fly like a normal glider once on tow. If the towed aircraft is unmanned, then the grid fins 64 will typically remain deployed in order to control the towed aircraft 12 from the tow plane 10. In other cases, a wire capable of transmitting communications between the tow aircraft 10 and the towed aircraft 12 can run along the tow line 26 and can be connected to the controls on the towed aircraft 12, and command the towed aircraft's controls to steer the towed aircraft 12 on aero-tow instead of using the control surfaces 62 on the tow line receiver 24, such as the actuated grid fins 64.

The towed aircraft (or second aircraft) 12 is towed to a second location that is spaced away from the first location where the tow plane 10 and towed aircraft 12 was joined together with the aerial vehicle towing system 20. The towed aircraft 12 can be towed any suitable distance to the second location including, but not limited to greater than or equal to 1 mile, 2, 3, etc. miles up to several thousand miles. The towed aircraft 12 is not brought inside the tow plane 10. The tow plane 10, therefore, does not require (and is free of) mechanisms (e.g., apparatuses for grasping the towed aircraft and/or ramps) to bring the towed aircraft 12 inside the tow plane 10. The towed aircraft 12 can be released from the tow line receiver, and can fly under its own engine power to carry out a mission at said second location. The mission typically involves carrying out activities other than merely landing.

The towed aircraft 12 can be disconnected from tow in two ways, by a release from (e.g., by a signal from) the towed aircraft 12, or by release from the tow plane 10. The towed aircraft 12 can be disconnected from tow at various times and situations. The towed aircraft 12 can be disconnected from the tow line receiver 24 when the towed aircraft 12 is in the air after it has been towed to its destination. In some cases, the towed aircraft 12 can be disconnected from the tow aircraft 10 prior to landing. In other cases, the tow aircraft 10 can land with the tow aircraft 12 on tow, and the towed aircraft 12 can disconnect when both aircraft are on the ground.

Disconnecting from the tow line receiver 24 in the air may be desirable in several other situations. In one situation, if there is excessive slack in the tow line 26 that is not recoverable using the winch 28, it may be desirable to disconnect from the tow line receiver 24. For example, if the towed aircraft 12 rises above the tow plane 10, and excessive slack develops in the tow line 26, this could result in the towed aircraft 12 diving down on the tow plane 10. In addition, in the event of an emergency, for example, in order to prevent a wing wrapping incident where the tow line 26 gets wrapped around the wing or a propeller of the towed aircraft 12, or in the event of such wing wrapping incident, the towed aircraft 12 may release its connection to the tow line receiver 24. The tow plane 10 also has the ability to disconnect the tow line receiver 24 from the towed aircraft 12, and to disconnect the tow line 26 from connection with the tow plane 10.

There are numerous, non-limiting embodiments of the apparatuses, systems, and methods for towing an aircraft mid-flight. All embodiments, even if they are only described as being "embodiments" of the invention, are intended to be non-limiting (that is, there may be other embodiments in addition to these), unless they are expressly described as limiting the scope of the invention. The steps of the methods described herein can be performed in any suitable order and, in some cases, one or more steps may be omitted, if desired. Any of the embodiments described herein can also be combined with any other embodiments in any manner to form still other embodiments.

Figure 12:
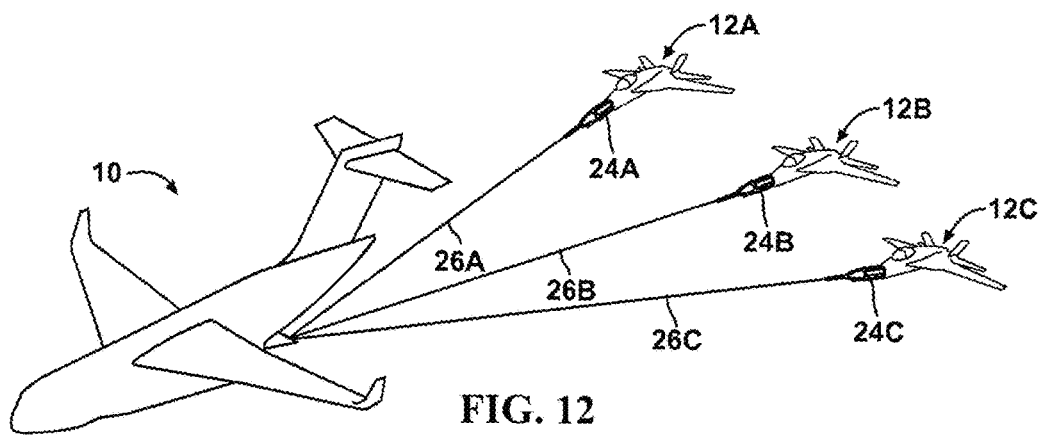
FIG. 12 is a schematic perspective view of a tow plane towing multiple aircraft using multiple tow line receivers as described herein.

FIG. 12 shows that multiple tow line receivers 24A, 24B, and 24C and tow lines 26A, 26B, and 26C can be extended behind the tow plane 10 in order to tow multiple aircraft 12A, 12B, and 12C. One or more of the towed aircraft 12, 12A, 12B, and 12C in the various drawing figures can be low observable or stealth aircraft. The tow plane 10 can, in various embodiments, tow any suitable number of aircraft from 1-20, or more.

Figure 13:
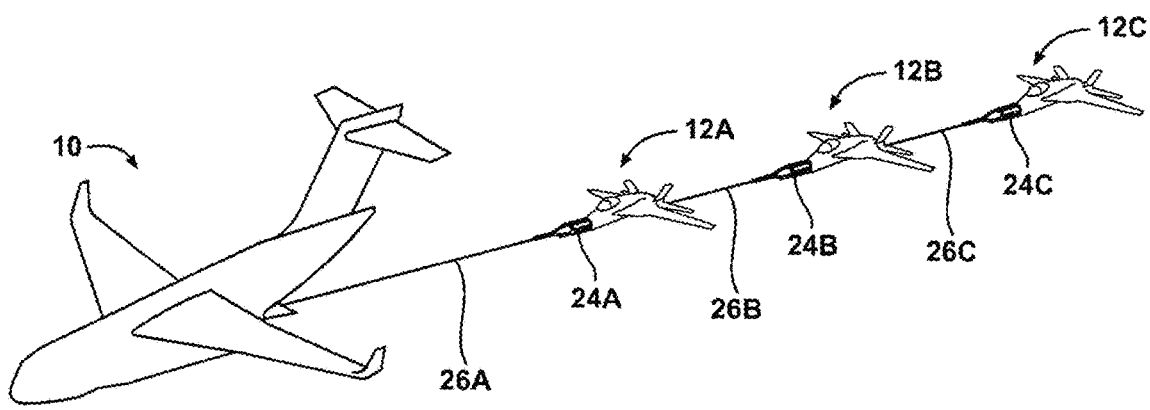
FIG. 13 is a schematic perspective view of a tow plane towing multiple aircraft in series.

FIG. 13 shows that in some embodiments, the towed aircraft 12A and 12B can also have an extendable tow line receiver therefrom (e.g., 24B and 24C). In this case, the same system can be used to attach multiple towed aircraft 12A, 12B, and 12C in-line (that is, in series). In other embodiments, there can be two chains of aircraft in series (as in FIG. 13) that form a V-formation of towed aircraft. Being able to control the position of the tow line receivers 24A, 24B, and 24C and the tow lines 26A, 26B, and 26C allows for multiple towed aircraft 12A, 12B, and 12C to be hooked up to the same tow plane 10 in mid-flight, which would not otherwise be possible.

Figure 14:
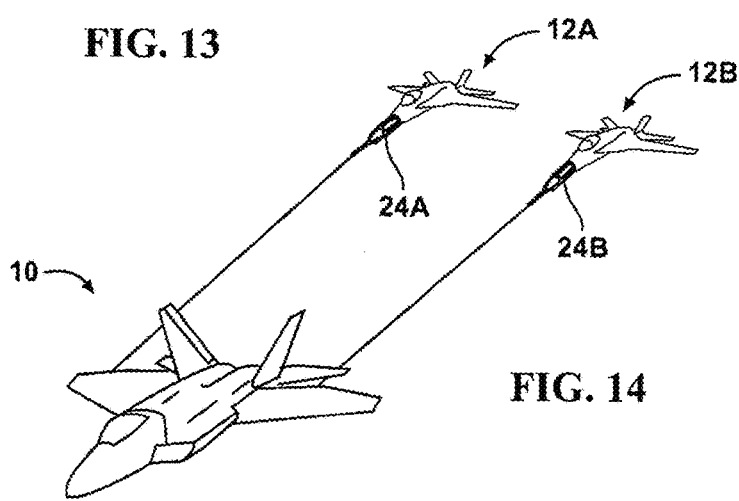
FIG. 14 is a schematic perspective view of a fighter aircraft towing drones from its wings.

FIG. 14 shows that in another embodiment, the tow aircraft 10 may be a fighter aircraft that has multiple two tow line receivers 24A and 24B, in this case, one extending from each of its wings, and the systems can tow smaller aircraft 12A and 12B. In some cases, the smaller aircraft 12A and 12B may comprise drone wingmen, such as Boeing's Loyal Wingman drones developed for the Royal Australian Air Force. In addition, in some cases, the aerial vehicle towing systems on the fighter aircraft may be joined to the underside of the fighter aircraft with a detachable joining mechanism that allows the fighter aircraft to drop the aerial vehicle towing systems after the smaller aircraft 12A and 12B are launched so that the fighter aircraft may enter combat without the towing equipment.

The aerial vehicle towing system 20 can be used to tow slower aircraft, not merely to launch the slower (or unpowered) aircraft airborne as in the case of gliders, but to increase the flight speed of the slower aircraft for the purpose of carrying out its mission. Thus, a method is provided that comprises: a) providing a first tow aircraft 10 that has a first maximum airspeed and a mechanism 24 for towing another aircraft joined thereto; b) providing a second aircraft 12 that has a second maximum airspeed that is less than the first maximum airspeed; c) while the second aircraft 12 is in flight, connecting the mechanism 24 for towing to the second aircraft 12; and d) towing the second aircraft 12 with the first aircraft 10 at a speed that is greater than the second maximum airspeed.

In the foregoing method of towing an aircraft to increase its flight speed, the towed aircraft 12 can be non-powered (e.g., a glider), or powered. The second maximum airspeed of a powered aircraft is the speed which it is capable of flying using its own power. In some cases, an aircraft 12 that is not capable of supersonic speed on its own may be connected to a supersonic aircraft 10 at a speed below the sound barrier, then the supersonic aircraft 10 can speed up and tow the towed aircraft 12 at supersonic speeds. Of course, in any of these cases, the aircraft 12 being towed must be structurally capable of being towed at such higher speeds.

The method of towing the aircraft can be used for delivering a low observable aircraft to a second location, where the towed aircraft 12 is a low observable aircraft. In such cases, the first tow aircraft 10 has a first radar signature and the second aircraft 12 has a second radar signature. The second radar signature may be less than the radar signature of the first aircraft. The first radar signature may be detectable as an aircraft. The second aircraft 12 may have a radar signature that is less than that of an aircraft or is not detectable. The low observable aircraft may be one of: a UAV, a fighter aircraft, or a bomber. The towed aircraft 12 may, in some cases, have a larger payload for carrying munitions than the tow aircraft. The method may further comprise sending secure undetectable communications between (to and/or from) the tow aircraft and the second aircraft. For example, the second aircraft may gather reconnaissance information. Such information could be downloaded to the tow aircraft 10.

Figure 15:
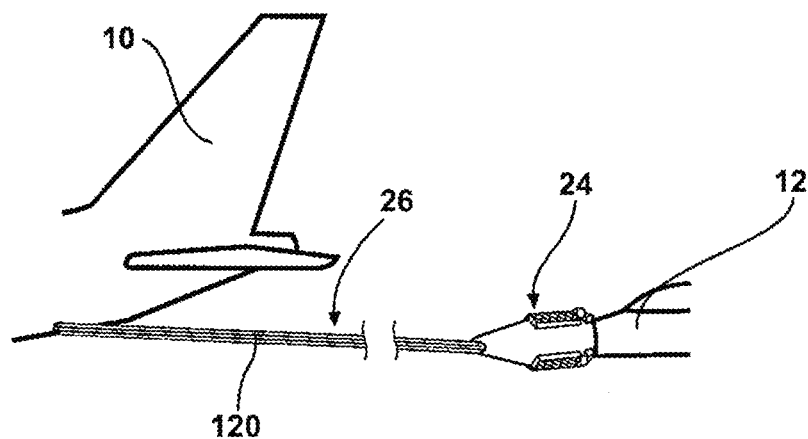
FIG. 15 is a fragmented schematic perspective view of an aerial refueling hose extending between a tow aircraft and an aircraft being towed.

The method of towing the aircraft can also be used for refueling the aircraft being towed. FIG. 15 shows that a fuel line 120 can be extended from the tow aircraft 10 to the aircraft being towed 12 (such as along the tow line 26) in order to refuel the aircraft being towed 12. The method of towing and refueling an aircraft in flight may comprise the steps of: a) providing a tanker aircraft 10 with an aerial vehicle towing system and a refueling line; b) when the aircraft 12 to be refueled is in flight, flying the tanker aircraft 10 in front of the aircraft to be refueled, wherein the aircraft 12 to be refueled has at least one engine, and the engine is powering the aircraft 12 to be refueled; c) connecting the aerial vehicle towing system and a refueling line 120 to the aircraft 12 to be refueled; d) towing the aircraft to be refueled 12 with the vehicle towing system; e) in some cases, turning off the power to at least one engine on the aircraft 12 to be refueled; f) transferring fuel from the tanker aircraft 10 to the aircraft 12 to be refueled, wherein the aircraft 12 to be refueled is now a refueled aircraft; and if power to an engine was turned off, restarting the at least one engine on the refueled aircraft 12; and h) disconnecting the aerial vehicle towing system and refueling line from the refueled aircraft 12. The method of refueling an aircraft being towed can also be used in any of the cases in which a slower aircraft is being towed at a higher rate of speed than it is otherwise capable of flying (including when being towed at supersonic speed).

The aerial vehicle towing system 20 can be used to tow aircraft 12 that has a limited range for the purpose of delivering the aircraft 12 with the limited range to a new location for the purpose of carrying out its mission. Thus, a method is provided that comprises: a) providing a first tow aircraft 10 that has a first maximum range and a mechanism 24 for towing another aircraft joined thereto; b) providing a second aircraft 12 that has a second maximum range that is less than the first maximum range; c) while the second aircraft 12 is in flight, connecting the mechanism 24 for towing to the second aircraft 12; and d) towing the second aircraft 12 with the first aircraft 10 for a distance that is greater than the second maximum range. The term "maximum range", as used herein, is the maximum distance the aircraft can fly when it is fully fueled or charged. The method may further comprise a step e) of disconnecting the mechanism 24 for towing from the second aircraft 12 and allowing the second aircraft to continue flying.

Figure 16:
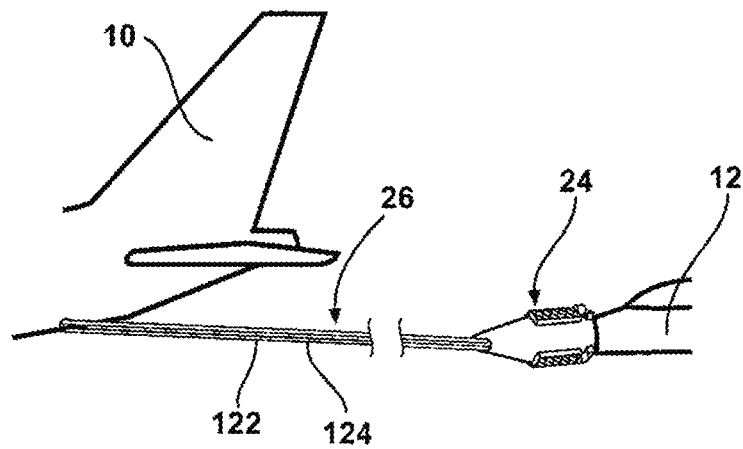
FIG. 16 is a fragmented schematic perspective view showing a cable for an aerial recharging system and a cable for communicating between a tow aircraft and an aircraft being towed.

FIG. 16 shows that the aerial vehicle towing system 20 can be used for "aerial recharging". Current battery powered aircraft do not have enough thrust to have any meaningful range, but have a high endurance allowing them to stay aloft for a long duration of time. The tow aircraft 10 can serve as a tow and charging (or tow/charging) aircraft. FIG. 16 shows that the aerial vehicle towing system 20 can have a charging connector 122 extending along the tow line 26 that allows battery powered towed aircraft 12 to recharge midflight and continue on its journey. The charging connector 122 extending along the tow line 26 can mate with a charging cable of the towed aircraft 12, such as through a docking system. The charging cable is connected to the battery components of the towed aircraft 12. The aerial recharging system described herein provides advantages over current drone recharging methods which are either powered by a laser or have to connect to a line from the ground. The aerial recharging system may also be beneficial to the private sector as it continues to advance nodal city transportation with eVTOL (electric Vertical Take Off and Landing) vehicles.

FIG. 16 also shows a method of communicating between a tow aircraft 10 and an aircraft being towed 12 may be provided. The communication system has various applications including, but not limited to the following. The aircraft 12 being towed may have a need for radio silence or other transmission silence. The aircraft 12 being towed can hook up to the tow plane 10 and download information to and/or from the tow plane 10 through a communication cable 124 that may extend along the tow line 26. The communication system can also be used if the data is too large and/or confidential to send wirelessly between the aircraft 10 and 12. The communication system can further be used to upload a new flight path to an unmanned aircraft (e.g., a drone), and the drone can unhook and continue on its mission.

In addition, with data being sent back and forth between the tow plane 10 and the on-tow aircraft 12 at a rate approaching the speed of light, the tow plane 10 and tow line receiver 24 can also augment the stability of an autonomous aero-tow system by controlling the ailerons, rudders, and elevators of the towed aircraft 12 without delay in the control system. For example, having multiple drones on aero tow is an airspace issue, but if all the information needed to control the towed aircraft 12 is passed to the drones through the cables, then they can fly in formation behind the tow plane 10 with ease.

Further, if space assets ever get contested, the aerial vehicle towing system 20 can increase surveillance over key areas of interest. For example, the aerial vehicle towing system 20 can be used to tow surveillance aircraft (such as Predator drones) if satellites encounter problems due to weather, or if they are attacked. The aerial vehicle towing system 20 provides the advantage that it can tow certain aircraft faster than such aircraft can fly.

Figure 17:
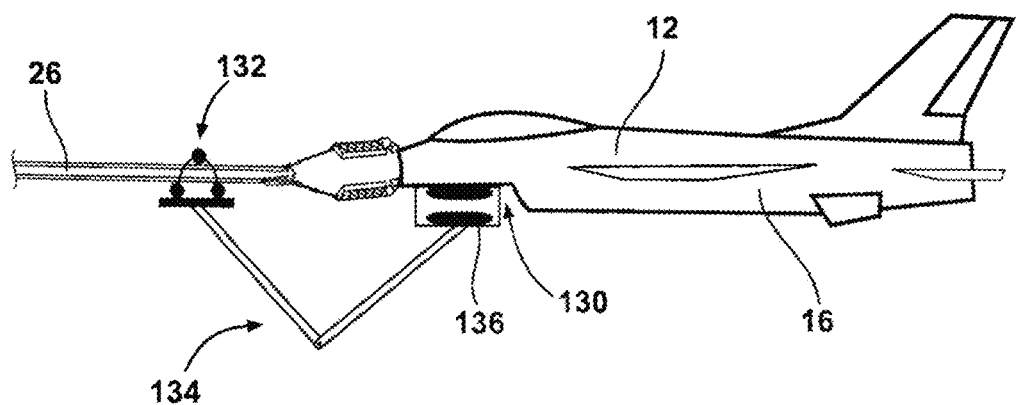
FIG. 17 is a fragmented side view showing a mechanism for transferring items to an aircraft being towed.

The aerial vehicle towing system 20 can also be used for transferring items between the tow aircraft 10 and the towed aircraft 12. In various embodiments, such items can be transferred from the tow aircraft 10 to the towed aircraft 12, or from the towed aircraft 12 to the tow aircraft 10. Items that can be transferred include, but are not limited to cargo, supplies, and munitions (e.g., to rearm the towed aircraft 12). FIG. 17 shows one embodiment of an apparatus and method for transferring items from the tow aircraft 10 to the towed aircraft 12. In this embodiment, the towed aircraft 12 is provided with an internal bay 130 on the underside of its fuselage 16. A trolley system 132 is provided that runs along the tow line 26. The trolley system 132 is provided with a mechanism 134 for transferring a cartridge 136 containing items for the tow aircraft into the internal bay 130 of the towed aircraft 12. In some cases, this embodiment can be combined with an aerial refueling system so that the towed aircraft 12 can be reloaded and refueled at the same time.

Figure 18:
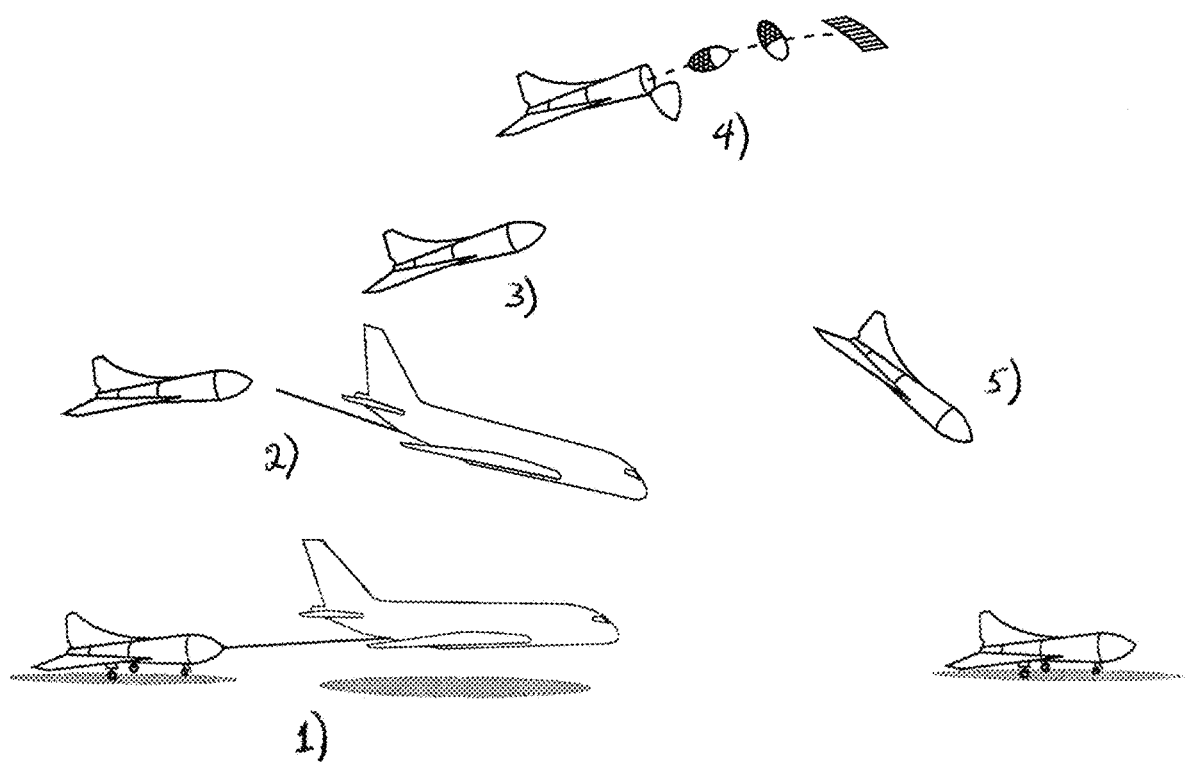
FIG. 18 is a schematic drawing of the sequence involved in launching a space vehicle with a tow aircraft.

FIG. 18 shows the sequence involved in launching a space vehicle with a tow aircraft. The first step involves a tow aircraft towing a space vehicle from a starting position, such taking off from the ground. The second step involves the release of the space vehicle and the tow aircraft returning to base. The third step involves the space vehicle accelerating to higher altitudes using its rocket engines. The fourth step may involve the space vehicle performing some task in space, such as releasing a payload. The fifth step involves the space vehicle re-entering and gliding through the atmosphere. After the space vehicle enters the atmosphere, the space vehicle can be hooked up to (the same or different) tow aircraft mid-flight by the aerial vehicle towing system described herein, and towed to a particular destination. This will allow the space vehicle to be launched from and returned to airports anywhere around the world.

Figure 19:
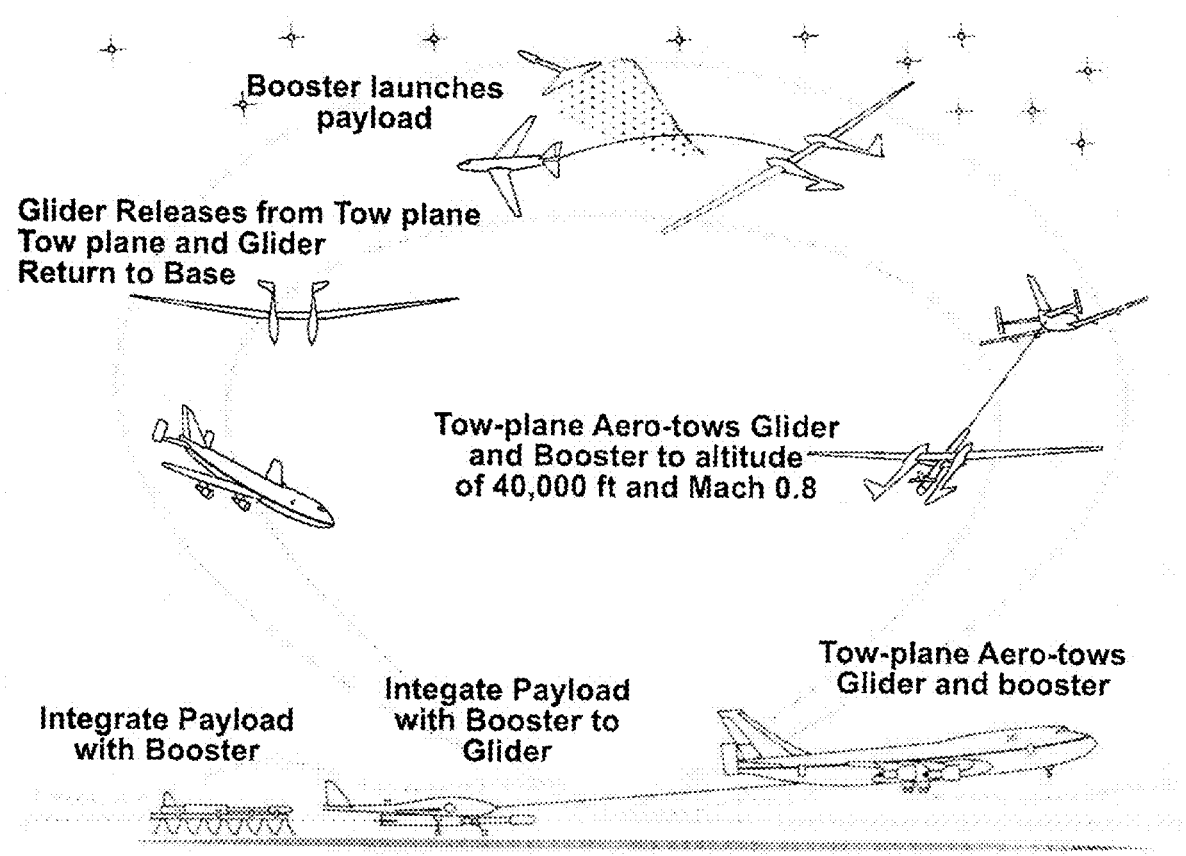
FIG. 19 is a schematic drawing of the sequence involved in launching a space vehicle or hypersonic vehicle from a glider that is towed to altitude by a tow aircraft.

FIG. 19 shows the sequence involved in launching a space vehicle or hypersonic vehicle from a glider that is towed to altitude by a tow aircraft. The first step in FIG. 19 may involve integrating a payload with a booster. The second step involves joining the payload and booster to a glider. A tow plane then aero tows the glider and booster from a starting position, such taking off from the ground. The tow plane aero tows the glider and booster to the desired altitude. The booster with the payload then launches from the glider. In FIG. 19, the glider may release from the tow plane and the glider and tow plane may return to base. The systems and methods described herein may allow the glider to reconnect to the same or different tow plane and be brought back to an airport, allowing for unannounced launches anywhere in the world. Alternatively, the aerial vehicle towing system and methods described herein can allow the glider to remain connected to the tow plane.

The aerial vehicle towing system 20 and methods for towing an aircraft mid-flight described herein can provide a number of advantages. It should be understood, however, that these advantages need not be required unless they are set forth in the appended claims.

The aerial vehicle towing system allows a tow aircraft to connect or reconnect with an aircraft to be towed in the air instead of only on the ground. The aerial vehicle towing system, thus, provides a much-needed upgrade to the WWII process of launching gliders. Since the towed aircraft can hookup in the air with the precise control provided by the tow line receivers, multiple aircraft may be attached to a single tow plane and towed. The aerial vehicle towing system, thus, solves the prior problems associated with attempting to have one aircraft tow multiple aircraft.

The aerial vehicle towing system is well-suited to retrieve a powered or non-powered aircraft mid-flight. The methods described herein improve upon current drone recapture methods that bring the drone into a cargo bay of an aircraft or which contain the drone in a manner that prevents the drone from flying after it has been captured. The aerial vehicle towing system is not subject to those restrictions. The present method allows the unmanned aerial system to fly outside of the tow plane and then be detached again for a new theater or mission.

The aerial vehicle towing system provides the ability to join one or more aircraft to a towing aircraft and deliver the towed aircraft to distant locations, thus increasing the range of the mission of the towed aircraft. This is more efficient than attempting to aerially refuel multiple aircraft (such as drones) over distances of thousands of miles.

In embodiments that provide aerial recharging or refueling, the aerial vehicle towing system extends the range of the towed aircraft, whether they are powered by jet fuel or electricity. This can allow a mission asset to be towed to a location where it loiters. The towed aircraft can then be refueled and continue its mission.

The aerial vehicle towing system may be useful in many situations including, but not limited to: unmanned aerial system recovery, commercial aviation, engine-out emergencies of airliners, and evacuation of personnel, humanitarian relief, emergency rescue, and recreational sailplane aviation.

The term "joined", as used herein, encompasses configurations in which an element is directly secured to another element by affixing the element directly to the other element;

configurations in which the element is indirectly secured to the other element by affixing the element to intermediate member(s) which in turn are affixed to the other element; and configurations in which one element is integral with another element, i.e., one element is essentially part of the other element. The term "joined" includes both those configurations in which an element is temporarily joined to another element, or in which an element is permanently joined to another element.

The disclosure of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

It should be understood that every maximum numerical limitation given throughout this specification includes every lower numerical limitation, as if such lower numerical limitations were expressly written herein. Every minimum numerical limitation given throughout this specification includes every higher numerical limitation, as if such higher numerical limitations were expressly written herein. Every numerical range given throughout this specification includes every narrower numerical range that falls within such broader numerical range, as if such narrower numerical ranges were all expressly written herein.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method of connecting a first tow aircraft to a second aircraft and towing said second aircraft in flight, wherein said second aircraft is a powered aircraft that has one or more engines and a nose with an aircraft connector on or adjacent to its nose, said method comprising the steps of:
   a) providing a first tow aircraft with an aerial vehicle towing system comprising a flexible tow line and a tow line receiver joined to said tow line;
   b) when a second aircraft is in flight and flying under its own engine power at a first location, flying said tow aircraft in front of the second aircraft;
   c) extending said tow line and tow line receiver toward the second aircraft;
   d) establishing a connection between said aircraft connector on the second aircraft and the tow line receiver;
   e) towing the second aircraft connected to the tow line receiver with said tow aircraft while both said tow aircraft and second aircraft are airborne, wherein said second aircraft is towed to a second location that is spaced away from the first location by a distance greater than or equal to 1 mile; and
   f) releasing the second aircraft from the tow line receiver, wherein second aircraft flies under its own engine power to carry out a mission at said second location and refueling the second aircraft, wherein:
   said first aircraft is a tanker aircraft that is provided with a refueling line;
   step d) comprises connecting said aerial vehicle towing system and said refueling line to said second aircraft;
   turning off the power to at least one engine of said second aircraft after the connection is established in step d);
   transferring fuel from said tanker aircraft to said second aircraft while towing said second aircraft;
   restarting said at least one engine on said second aircraft prior to step f); and
   step f) also comprises disconnecting said refueling line from said second aircraft.

2. A method of towing and refueling an aircraft in flight at supersonic speed according to claim 1 wherein:
   said tanker aircraft is capable of supersonic speed;
   the step of transferring fuel from said tanker aircraft to said second aircraft occurs while towing said second aircraft at supersonic speed.

* * * * *